(12) United States Patent
Ou et al.

(10) Patent No.: US 11,449,109 B2
(45) Date of Patent: Sep. 20, 2022

(54) MULTI-AXIS SOFT HINGE MECHANISM AND FOLDABLE DEVICE HAVING SAME

(71) Applicant: Google LLC, Mountain View, CA (US)

(72) Inventors: Davis Ou, New Taipei (TW); Mike Liu, New Taipei (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/250,666

(22) PCT Filed: Sep. 11, 2020

(86) PCT No.: PCT/US2020/070532
§ 371 (c)(1),
(2) Date: Feb. 17, 2021

(87) PCT Pub. No.: WO2021/051137
PCT Pub. Date: Mar. 18, 2021

(65) Prior Publication Data
US 2021/0294389 A1    Sep. 23, 2021

Related U.S. Application Data

(60) Provisional application No. 62/899,487, filed on Sep. 12, 2019.

(51) Int. Cl.
*G06F 1/16* (2006.01)
(52) U.S. Cl.
CPC .......... *G06F 1/1681* (2013.01); *G06F 1/1641* (2013.01); *G06F 1/1652* (2013.01)
(58) Field of Classification Search
CPC .... G06F 1/1681; G06F 1/1641; G06F 1/1652; G06F 2203/04102; E05Y 2900/606; H04M 1/0216; H04M 1/0268
See application file for complete search history.

(56) References Cited

U.S. PATENT DOCUMENTS 9,851,759 B2    12/2017    Tazbaz et al.
10,114,421 B2 *  10/2018    Lo .................. G06F 1/1641
(Continued)

FOREIGN PATENT DOCUMENTS

| CN | 110725855 A | 1/2020 |
| KR | 101487189 B1 | 1/2015 |
| KR | 20150037383 A | 4/2015 |

OTHER PUBLICATIONS

International Search Report and Written Opinion for Application No. PCT/US2020/070532, dated Jan. 19, 2021, 17 pages.

*Primary Examiner* — Rockshana D Chowdhury
(74) *Attorney, Agent, or Firm* — Brake Hughes Bellermann LLP

(57) ABSTRACT

A foldable device includes a housing, a foldable display coupled to the housing, and a hinge mechanism at a bendable section of the foldable display. The hinge mechanism includes hinge track modules movably coupling adjacent pairs of hinge beams. Each hinge track module includes a track member coupled to one of the pair of hinge beams. The track member includes an arcuate slot. First and second hinge shaft members positioned at first and second sides of the track member are coupled to the other of the pair of hinge beams. The first and second hinge shaft members include a hinge shaft slidably coupled in the arcuate slot of the track member. Outer peripheral contours of the hinge shafts correspond to an inner peripheral contour of the arcuate slot to guide movement of the hinge shafts in the arcuate slot and maintain the foldable display within allowable bending limits.

20 Claims, 21 Drawing Sheets

(56) References Cited

U.S. PATENT DOCUMENTS

| | | | |
|---|---|---|---|
| 10,114,424 B2 | 10/2018 | Campbell et al. | |
| 10,488,882 B2 * | 11/2019 | Määttä et al. | G06F 1/1616 |
| 10,694,623 B2 * | 6/2020 | Park | G09F 9/301 |
| 10,765,023 B2 * | 9/2020 | Zhang | G06F 1/1652 |
| 10,768,667 B2 * | 9/2020 | Lin | H04M 1/0216 |
| 10,834,814 B2 * | 11/2020 | Cho | H05K 5/0226 |
| 10,845,850 B1 * | 11/2020 | Kang | H04M 1/0268 |
| 10,895,894 B2 * | 1/2021 | Jan | G06F 1/1652 |
| 10,928,863 B2 * | 2/2021 | Pelissier | G06F 1/1681 |
| 11,003,217 B2 * | 5/2021 | Cha | H04M 1/0216 |
| 11,108,901 B2 * | 8/2021 | Lin | G06F 1/1624 |
| 11,169,580 B2 * | 11/2021 | Lee | G09F 9/301 |
| 11,175,695 B2 * | 11/2021 | Lin | H04M 1/0268 |
| 11,223,710 B2 * | 1/2022 | Cheng | G06F 1/1652 |
| 2020/0166969 A1 * | 5/2020 | Lee | G06F 1/1641 |
| 2020/0355216 A1 * | 11/2020 | Bae | G06F 1/1652 |
| 2021/0294389 A1 * | 9/2021 | Ou | G06F 1/1681 |
| 2021/0307186 A1 * | 9/2021 | Hong | G06F 1/1652 |
| 2022/0019268 A1 * | 1/2022 | Yu | H04M 1/0268 |

* cited by examiner

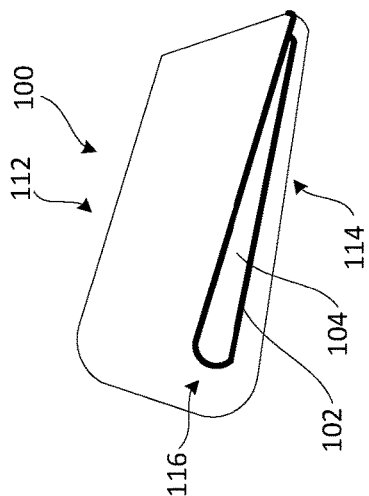
FIG. 1A
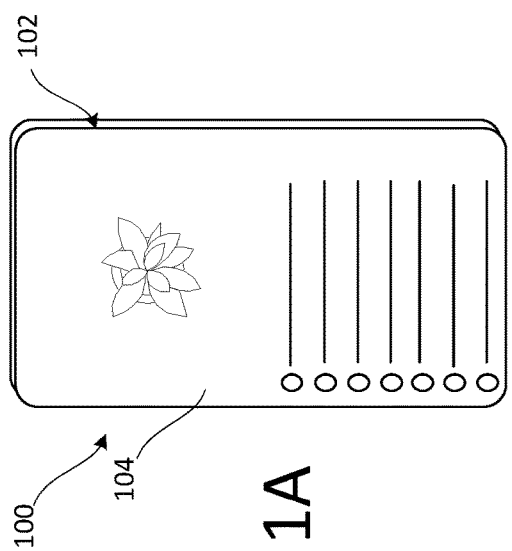
FIG. 1B
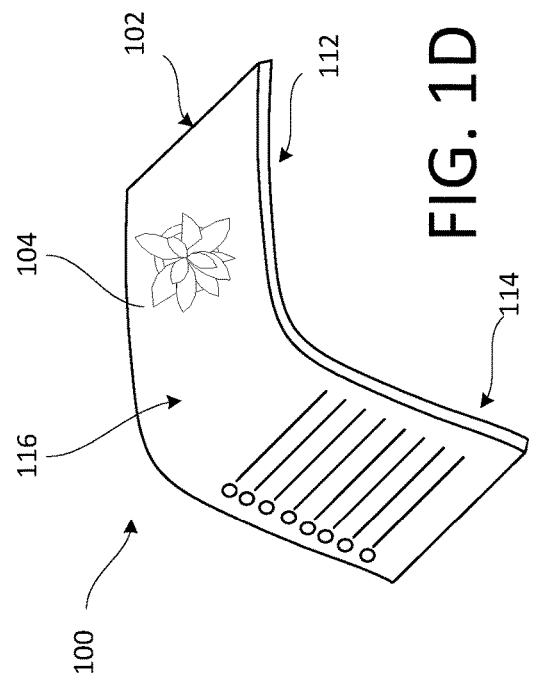
FIG. 1C
FIG. 1D

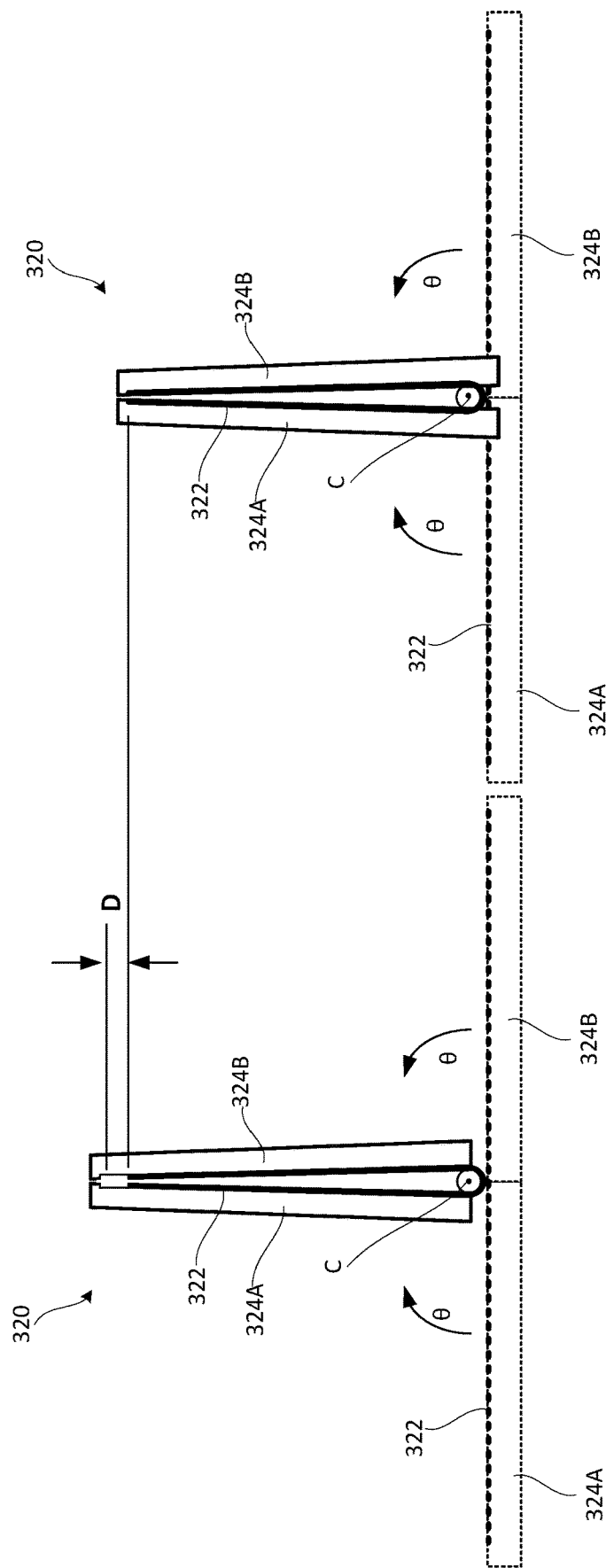

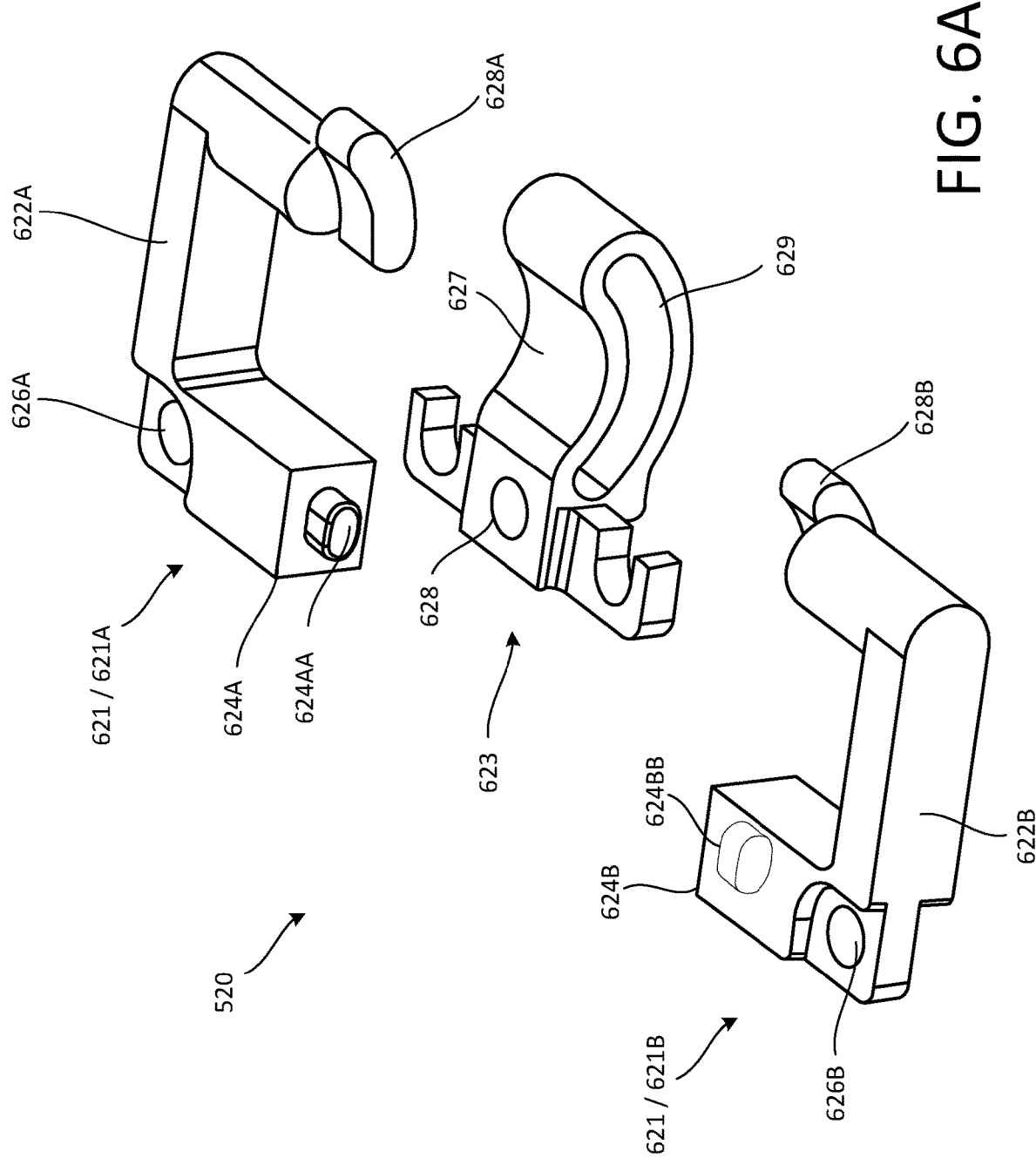

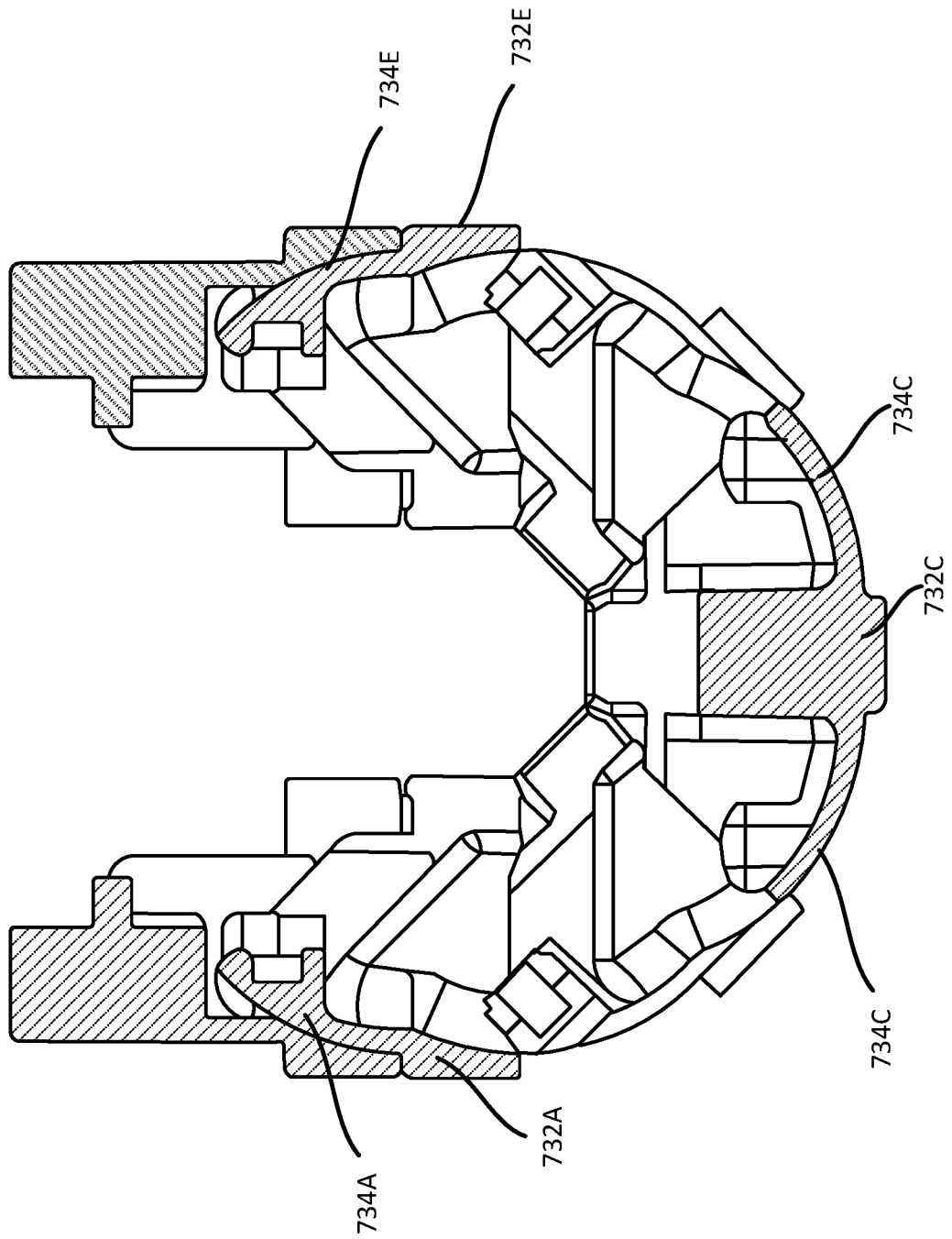

MULTI-AXIS SOFT HINGE MECHANISM AND FOLDABLE DEVICE HAVING SAME

CROSS-REFERENCE TO RELATED APPLICATIONS

This application is a 35 U.S.C. 071 National Phase Entry Application from International Patent Application No. PCT/US2020/070532, filed on Sep. 11, 2020, entitled "MULTI-AXIS SOFT HINGE MECHANISM AND FOLDABLE DEVICE HAVING SAME", which claims priority to U.S. Application No. 62/899,487, filed on Sep. 12, 2019, the disclosures of which are incorporated by reference herein in their entirety.

TECHNICAL FIELD

This description relates, in general, to hinge mechanisms for foldable devices, and, in particular, to hinge mechanisms supporting foldable display systems.

BACKGROUND

Modern computing devices often attempt to achieve a balance between portability and functionality. Users desire a device that provides for a rich display of information on a single larger surface as well as a conflicting desire for a device that is small enough to be easily carried. A device with a flexible, or foldable, display component may have a relatively small form factor in a folded configuration and yet provide a relatively large display area in an unfolded configuration. In some situations, mechanisms guiding and supporting the folding and unfolding of such a display component may be relatively complex and susceptible to failure. These complex mechanisms may introduce stress on the display component of a foldable device, thus damaging components of the display component of the foldable device.

SUMMARY

A hinge mechanism, in accordance with implementations described herein, provides flexible support in a bending area of a foldable display portion of a foldable device. A hinge mechanism, in accordance with implementations described herein, maintains a desired contour or curvature of the foldable display portion in the folded configuration, and maintains a desired flatness of the foldable display portion in the unfolded configuration. A hinge mechanism, in accordance with implementations described herein, prevents damage due to excessive compression and/or tension exerted on components of the foldable display portion in response to folding and unfolding of the foldable device.

In one general aspect, a hinge mechanism includes a plurality of hinge beams each extending longitudinally, arranged in a row, and at least one hinge track module, each hinge track module movably coupling an adjacent pair of hinge beams of the plurality of hinge beams. In some implementations, the at least one hinge track module includes a track member including an arcuate slot formed therein, the arcuate slot having a first end and a second end, the track member being coupled to a first hinge beam of an adjacent pair of hinge beams such that track member moves together with the first hinge beam, and a first hinge shaft member positioned at a first side of the track member, the first hinge shaft member being coupled to a second hinge beam of the adjacent pair of hinge beams such that the first hinge shaft member moves with the second hinge beam. In some implementations, the first hinge shaft member includes a first body portion with a first end portion, and a first hinge shaft extending outward from the first end portion of the first body portion, the first hinge shaft being inserted into and movably received into the arcuate slot from the first side of the track member to movably couple the first hinge shaft member and the track member.

In some implementations, in a folded configuration of the hinge mechanism, the first hinge shaft abuts the first end of the arcuate slot formed in the track member, so as to restrict further sliding of the first hinge shaft in a first direction in the arcuate slot and a corresponding further folding motion of the hinge mechanism. In some implementations, in an unfolded configuration of the hinge mechanism, the first hinge shaft abuts the second end of the arcuate slot formed in the track member so as to restrict further sliding of the first hinge shaft in a second direction in the arcuate slot and a corresponding further unfolding motion of the hinge mechanism.

In some implementations, a contour of the arcuate slot in the track member guides a sliding movement of the first hinge shaft from a position at the first end of the slot in which the hinge mechanism is in a folded configuration, and a position at the second end of the slot in which the hinge mechanism is in an unfolded configuration. In some implementations, any pair of adjacent hinge beams is coupled by at least one hinge track module.

In some implementations, the hinge track module also includes a second hinge shaft member positioned at a second side of the track member, the second hinge shaft member being coupled to the second hinge beam of the adjacent pair of hinge beams such that the second hinge shaft member moves with the second hinge beam. In some implementations, the second hinge shaft member includes a second body portion having a first end, and a second hinge shaft extending outward from the first end portion of the second body portion, the second hinge shaft being movably received into the arcuate slot from the second side of the track member to movably couple the second hinge shaft member and the track member. In some implementations, a protrusion extends outward from a second end portion of the body portion of the first hinge shaft member the second hinge shaft member, and an opening is formed in a second end portion of the body portion of the second hinge shaft member, wherein the protrusion is received in the opening.

In some implementations, the hinge mechanism is configured to be coupled in a computing device including a foldable display, at a portion of the computing device corresponding to a bendable section of the foldable display, with the at least one hinge track module comprising a plurality of hinge track modules. In some implementations, the hinge mechanism also includes a first hinge beam bracket at a first end of the plurality of hinge beams and configured to be coupled to a first housing of a computing device, and a second hinge beam bracket at a second end of the plurality of hinge beams and configured to be coupled to a second housing of the computing device. In some implementations, the first hinge beam bracket and a hinge beam at a first end of the arrangement of the plurality of hinge beams are movably coupled by one of the plurality of hinge track modules, and the second hinge beam bracket and a hinge beam at a second end of the arrangement of the plurality of hinge beams are movably coupled by another of the plurality of hinge track modules. In some implementations, the hinge mechanism is configured to rotate the first housing and the second housing between an unfolded configuration of the computing device and a folded configuration of the computing device. In some implementations, in a folded configuration, the first hinge shaft and the second hinge shaft each abut the first end of the arcuate slot formed in the track member so as to restrict further folding motion of the hinge mechanism beyond a minimum bending radius of the foldable display and, in an unfolded configuration, the first hinge shaft and the second hinge shaft each abut a second end of the arcuate slot formed in the track member, opposite the first end thereof, so as to restrict further unfolding motion of the hinge mechanism. In some implementations, a contour of the arcuate slot defined in the track member guides a sliding movement of the first hinge shaft between the first end of the slot and the second end of the slot to guide a folding and unfolding motion of the foldable display within allowable bending limits of the foldable display.

In some implementations, at least one of the plurality of hinge beams includes a body extending longitudinally along a length of the hinge beam, and a first wing extending outward from a first side of the body. In some implementations, the at least one of the plurality of hinge beams includes a second wing extending outward from a second side of the body, opposite the first side of the body, and the first and second wings have an arcuate contour corresponding to a contour of the first hinge shaft and a contour of the arcuate slot in the track. In some implementations, in a folded configuration of the hinge mechanism, the first wing extends across a gap formed between the hinge beam and an adjacent hinge beam positioned at the first side of the hinge beam, and the second wing extends across a gap formed between the hinge beam and an adjacent hinge beam positioned at the second side of the hinge beam and, in an unfolded configuration of the hinge mechanism, the first wing is received in a space formed between the body of the hinge beam and the body of the adjacent hinge beam positioned at the first side of the hinge beam, and the second wing is received in a space formed between the body of the hinge beam and the body of the adjacent hinge beam positioned at the second side of the hinge beam.

In another general aspect, a foldable device includes a housing having a first portion and a second portion, a foldable display coupled to the first and second portions of the housing, the foldable display including a bendable section, and a hinge mechanism positioned between the first portion and the second portion of the housing, at a position corresponding to the bendable section of the foldable display. The hinge mechanism includes a plurality of hinge beams each extending longitudinally, arranged in a row, and a plurality of hinge track modules movably coupling adjacent pairs of hinge beams of the plurality of hinge beams. Each of the plurality of hinge track modules includes a track member coupled to a first hinge beam of the respective pair of hinge beams, the track member including an arcuate slot, the arcuate slot having a first end and a second end, and at least one hinge shaft member positioned at a side of the track member and coupled to a second hinge beam of the respective pair of hinge beams. In some implementations, at least one hinge shaft member includes a body having a first end portion, and a hinge shaft extending outward from the first end portion of the body, the hinge shaft having an outer peripheral contour corresponding to an inner peripheral contour of the arcuate slot, the hinge shaft being inserted into and slidably received in the arcuate slot formed in the track member to movably couple the at least one hinge shaft member to the track member.

In some implementations, the at least one hinge shaft member includes a first hinge shaft member positioned at a first side of the track member and coupled to the first hinge beam of the pair of adjacent hinge beams, and movably coupled to the track member at the first side of the track member, and a second hinge shaft member positioned at a second side of the track member and coupled to the first hinge beam of the pair of adjacent hinge beams, and movably coupled to the track member at the second side of the track member. In some implementations, in a folded configuration of the foldable device, the first hinge shaft abuts the first end of the arcuate slot of the track member and the second hinge shaft abuts the first end of the arcuate slot of the track member so as to restrict further sliding of the first and second hinge shafts in a first direction in the arcuate slot and, in an unfolded configuration of the foldable device, the first hinge shaft abuts the second end of the arcuate slot of the track member and the second hinge shaft abuts the second end of the arcuate slot of the track member so as to restrict further sliding of the first and second hinge shafts in a second direction in the arcuate slot.

In some implementations, the foldable device also includes an opening formed in a second end portion of the body of the first hinge shaft member, and a pin extending outward from the second end portion of the body of the second hinge shaft member and received in the opening formed in the second end portion of the body of the first hinge shaft member to couple the first hinge shaft member such that the first hinge shaft member, the second hinge shaft member and the first hinge beam of the pair of adjacent hinge beams move together, and the first and second hinge shaft members are slidably coupled to the track member.

BRIEF DESCRIPTION OF THE DRAWINGS

FIGS. 1A-1D illustrate an exemplary computing device including an exemplary foldable display.

FIGS. 3A-4E schematically illustrate the determination of a fixed center of rotation of a plurality of hinge beams of a hinge mechanism, in accordance with implementations described herein.

FIG. 6A shows an exploded perspective view of a hinge track modules of the exemplary hinge mechanism shown in FIGS. 5A and 5B, in accordance with implementations described herein.

FIGS. 8B and 8C show cross-sectional views of a hinge mechanism, in a folded configuration and an unfolded configuration, respectively, in accordance with implementations described herein.

DETAILED DESCRIPTION

Figure 2A:
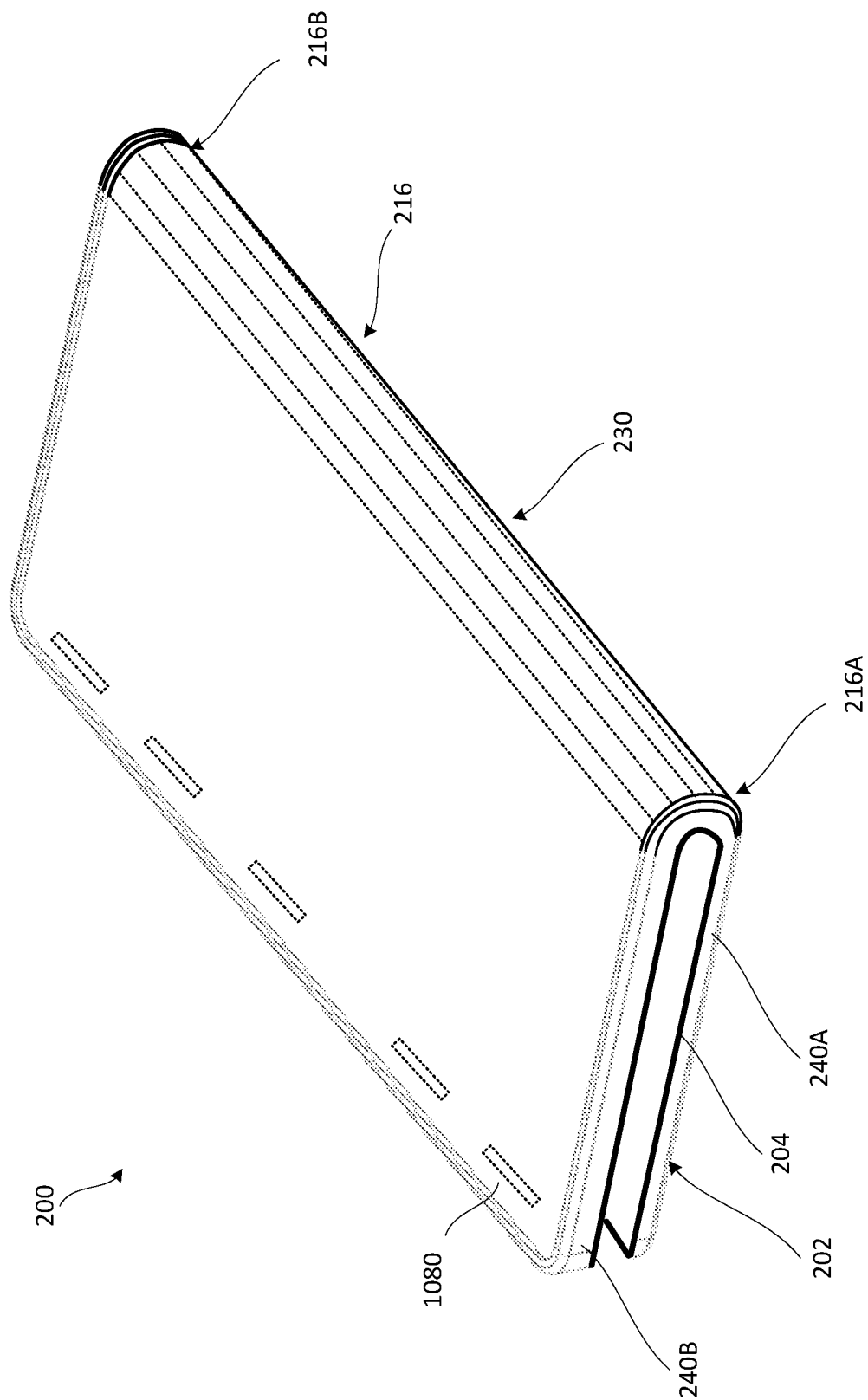
FIGS. 2A and 2B show perspective views of an exemplary computing device including an exemplary hinge mechanism, in a folded configuration and in an unfolded configuration, respectively, in accordance with implementations described herein.

A computing device including a hinge mechanism, in accordance with implementations described herein, may provide a relatively simple and reliable mechanism to support and guide the folding and the unfolding of a foldable display of the computing device. In some implementations, the hinge mechanism maintains the foldable display within allowable bending radius limits, both in the folded configuration and in the unfolded configuration of the computing device. In some implementations, the hinge mechanism maintains a desired degree of planarity of the foldable display in the unfolded configuration of the computing device. The relatively simple and reliable hinge mechanism guides and supports folding and unfolding of the computing device including the foldable display, while still providing support to the foldable display and while still maintaining the foldable display within allowable bending radius limits.

FIGS. 1A-1D illustrate an exemplary computing device 100 that includes a foldable layer 102. In particular, FIG. 1A shows a front view of the exemplary computing device 100 in an unfolded configuration. FIG. 1B shows a perspective view of the exemplary computing device 100 in a partially folded configuration. FIG. 1C shows a side view of the exemplary computing device 100 in a fully folded configuration. FIG. 1D shows a perspective view of the exemplary computing device 100 in a partially folded configuration. In the exemplary computing device 100 shown in FIGS. 1B and 1C, the foldable layer 102 is a foldable display 102 that is mounted so that a display surface 104 faces inward in the folded configuration. In the exemplary computing device 100 shown in FIG. 1D, the foldable layer 102 is a foldable display 102 that is mounted so that a display surface 104 faces outward in the folded configuration. The foldable display 102 can include a variety of different types of flexible displays, including, for example, a flexible organic light emitting diode (OLED) layer, an organic liquid crystal display (OLCD) layer, etc.

In some implementations, the foldable display 102 includes a first relatively flat, relatively rigid, or-semi-rigid, section 112, a second relatively flat, relatively rigid, or semi-rigid, section 114, and a foldable portion or bendable section 116. In some implementations, the foldable display 102 includes more than two flat, rigid sections 112, 114 and/or more than one bendable section 116. In some implementations, the foldable display 102 includes zero, or only one, flat rigid section 112, 114. For example, when a foldable display 102 includes zero flat rigid sections, the foldable display 102 may be substantially continuously bendable, and may be rolled up, as in a scroll. The exemplary foldable display 102 shown in FIGS. 1A-1D includes an exemplary bendable section 116 that allows the foldable display 102 to bend about an axis. In some implementations, the foldable display 102 includes more than one bendable section that allows the flexible display 102 to bend about more than one axis.

In the exemplary computing device 100 shown in FIGS. 1A-1D, the bendable section 116 may allow the foldable display 102 to bend, or fold, for example, in an arcuate shape, that has a bending radius, and/or radius of curvature. In some implementations, a hinge mechanism supports and guides a folding and an unfolding of the foldable display 102 at the bendable section 116. In some implementations, the hinge mechanism is installed in the computing device 100 at a position corresponding to the bendable section 116 of the foldable display 102. In some implementations, the hinge mechanism limits or restricts folding or bending of the foldable display 102 to within allowable bending parameters to prevent damage to fragile components of the foldable display 102. For example, in the folded configuration shown in FIG. 1C, the hinge mechanism may prevent the foldable display 102 from bending beyond a minimum bending radius (e.g., less than 10 millimeters, less than 5 millimeters, or less than 2 millimeters). In the unfolded configuration shown in FIG. 1A, the hinge mechanism may prevent the foldable display from bending beyond a maximum bending radius.

Figure 2B:
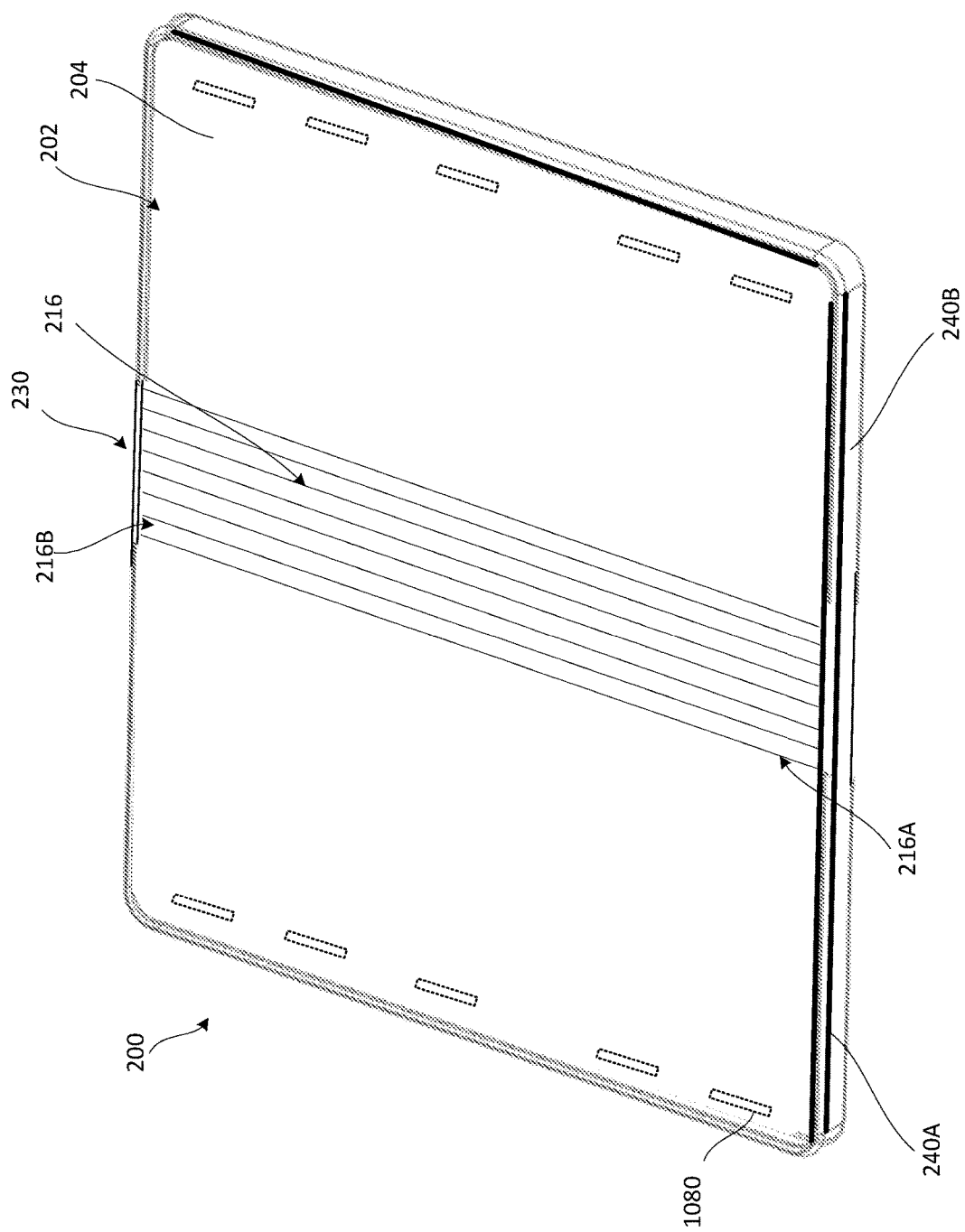

FIGS. 2A and 2B are perspective views of an exemplary computing device 200 including a foldable layer 202, such as, for example, a foldable display 202. The exemplary computing device 200 shown in FIGS. 2A and 2B may be supported by an exemplary hinge mechanism, which is described in more detail below. In the example shown in FIGS. 2A and 2B, the hinge mechanism 230 is received in a housing of the computing device 200 and positioned within the housing at a position corresponding to a foldable, or bendable, portion 216 of the foldable display 202, for example, between a first housing 240A and a second housing 240B of the computing device 200. In FIG. 2A, the exemplary computing device 200 is shown in the folded configuration. In FIG. 2B, the exemplary computing device 200 is shown in the unfolded configuration. In the exemplary computing device 200 shown in FIGS. 2A and 2B, the foldable display 202 is mounted on the computing device 200 so that a display surface 204 of the foldable display 202 faces inward when the device 200 is in the folded configuration. However, in some implementations, the foldable display 202 may be mounted so that the display surface 204 faces outward when the device 200 is in the folded configuration.

In the exemplary computing device 200 shown in FIGS. 2A and 2B, the bendable section 216 of the foldable display 202 is located at a central portion of the computing device 200. In some implementations, the bendable section 216 is located at positions other than the central portion of the computing device 200, and/or the foldable display 202 can include more bendable sections. In some implementations, the foldable display 202 is continuously bendable. In the exemplary foldable display 202 shown in FIGS. 2A and 2B, the bendable section 216 allows the foldable display 202 to bend about an axis.

The hinge mechanism 230, in accordance with implementations described herein, is located in the computing device 200, at a position corresponding to the bendable section 216 of the foldable display 202. The hinge mechanism 230 supports and guides the folding and the unfolding of the foldable display 202. That is, the hinge mechanism 230 supports and guides the folding and unfolding motion between the folded configuration shown in FIG. 2A and the unfolded configuration shown in FIG. 2B. In some implementations, the hinge mechanism 230 limits, or restricts, an amount of bending or folding in the folded configuration, to prevent the foldable display 202 from bending outside of allowable bending limits. For example, in some implementations, the hinge mechanism 230 limits, or restricts, an amount of bending or folding beyond a minimum bending radius of the foldable display 202. In some implementations, the hinge mechanism 230 limits, or restricts, an amount of bending or folding beyond a maximum bending radius of the foldable display 202.

A computing device including a hinge mechanism, in accordance with implementations described herein, supports and guides a folding and unfolding of a foldable display of the computing device, while also maintaining the foldable display within allowable bending limits, and providing for planarity in a bendable section of the foldable display in the unfolded configuration. The hinge mechanism, in accordance with implementations described herein, utilizes a no-torque design, that provides for a smooth folding and unfolding motion of the computing device including the foldable display. In developing a hinge mechanism to accomplish this, particularly without the use of complex gearing and/or sliding mechanisms, a center of rotation of the foldable display, a minimum bending radius of the foldable display, and other such factors may be taken into consideration.

For example, FIG. 3A provides a schematic illustration of an exemplary computing device 320 including a foldable display 322 in which a first body 324A and a second body 324B of the computing device 320 are slidably coupled to the foldable display 322. In contrast, FIG. 3B provides a schematic illustration of the exemplary computing device 320 in which the first body 324A and the second body 324B are adhered to the foldable display 322. To move from the unfolded configuration (shown in dotted lines) to the folded configuration (shown in solid lines), the foldable display 322 is rotated about a center of rotation C of the foldable display 322. A minimum, and a maximum, bending radius of the foldable display 3202 may be measured about the center of rotation C of the foldable display 322. In moving from the unfolded configuration to the folded configuration in the arrangement shown in FIG. 3A, the center of rotation of the first body 324A and the center of rotation of the second body 324B is not the same as the center of rotation C of the foldable display 322. This causes movement, for example, a sliding movement, of the first and second bodies 324A, 324B, in order to accommodate curvature at the bendable section of the foldable display 322 due to the folding and unfolding of the foldable display 322. This results in a stroke distance D, compared to the arrangement shown in FIG. 3B, in which the first and second bodies 324A, 324B are adhered to the foldable display 322. To reduce, or minimize, or substantially eliminate this stroke distance D, a center of rotation of the first and second bodies 324A, 324B of the computing device 320 may be determined separately from the center of rotation C of the foldable display 322. A hinge mechanism, in accordance with implementations described herein, allows the first and second bodies 324A, 324B to rotate about their respective centers of rotation, while the foldable display 322 rotates about its center of rotation C. In some implementations, a hinge mechanism, in accordance with implementations described herein, accomplishes this with a no torque force design that supports and guides the folding and unfolding motion, while still maintaining the foldable display within allowable bending limits. Determination of the individual center(s) of rotation to accommodate the folding and unfolding of the foldable display 322 to account for this difference is described in more detail with respect to the schematic illustrations shown in FIGS. 4A through 4E.

A hinge mechanism, in accordance with implementations described herein, includes multiple segments, or joints, or beams. Each of the multiple beams is rotatable about its own individual axis to provide for rotation between an unfolded configuration and a folded configuration of the hinge mechanism. For example, in some implementations, the hinge mechanism, provides for rotation from a folded configuration at approximately 0 degrees to an unfolded configuration at approximately 180 degrees. FIGS. 4A-4E schematically illustrate operation of an exemplary 4-axis design, which relies on five beams, with rotation of four of the beams about four respective, individual axes. Thus, in the exemplary arrangement shown in FIGS. 4A-4E, each of the four beams rotating about a respective center of rotation provides for approximately 45 degrees of rotation (totaling approximately 180 degrees of rotation). In some implementations, a multi-axis hinge mechanism, in accordance with implementations described herein, includes more, or fewer, beams, and rotates about more, or fewer, axes.

Figure 4A:
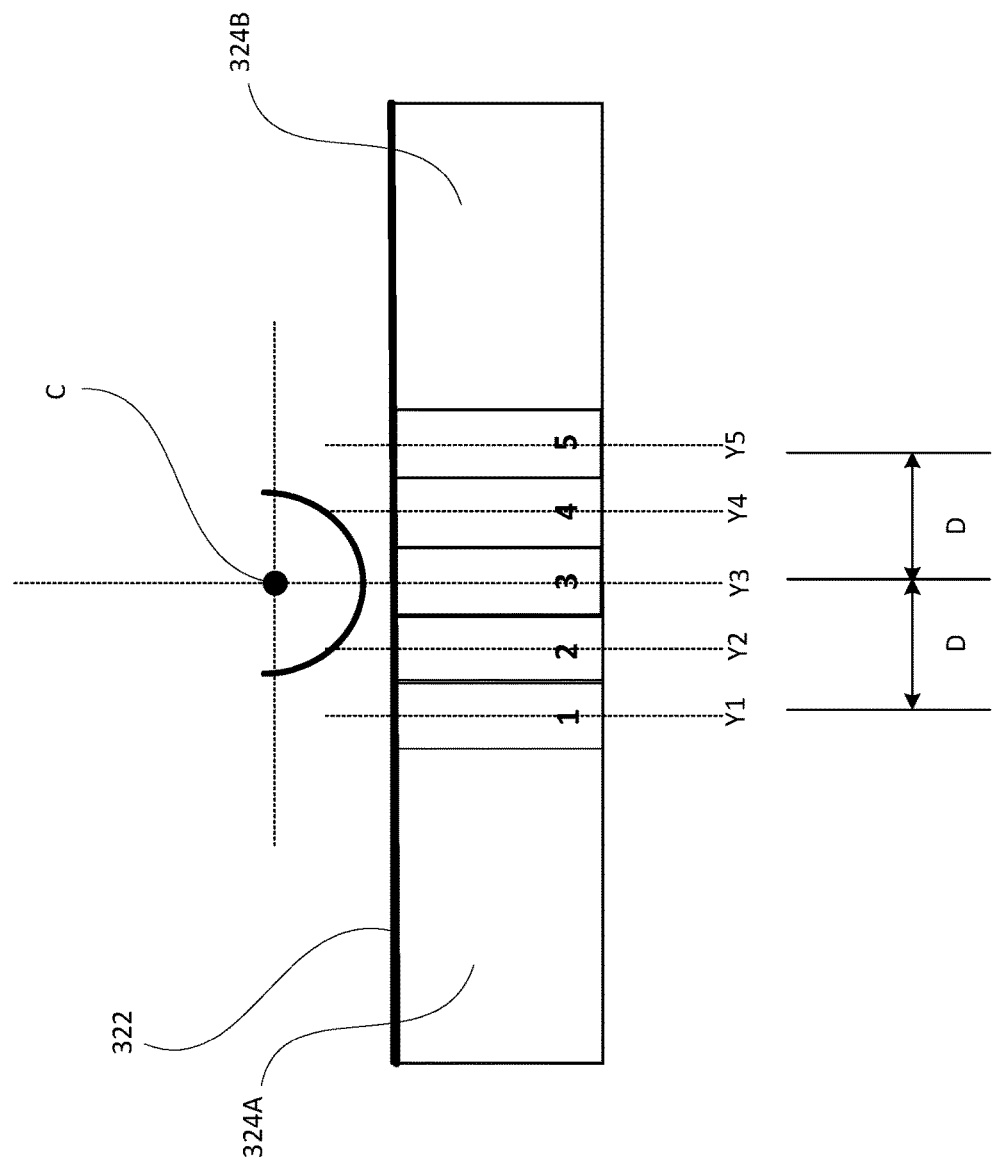

In the example shown in FIG. 4A, five exemplary beams 1, 2, 3, 4 and 5 are positioned corresponding to the bendable section of the foldable layer 322 having a center of rotation C. A respective center Y (Y1 through Y5) of each of the exemplary beams 1-5 is denoted by a respective dotted line, with the center beam 3 being substantially aligned with the center of rotation C of the foldable layer 322. Rotation of the five beams 1-5 forming the multi-axis (4-axis in this example arrangement) hinge mechanism may be sized, and positioned to account for the stroke distance D described above with respect to FIGS. 3A-3B. In the example shown in FIG. 4A, the beams 1-5 are symmetrically arranged relative to the center of rotation C of the foldable layer, to account for the stroke distance D to be covered by, for example, the first body 324A shown in FIGS. 3A and 3B, and also for the stroke distance D to be covered by, for example, the second body 324B shown in FIGS. 3A and 3B. Thus, in some implementations, the total stroke distance 2D is be divided by the number of beams/number of axes to determine positioning, sizing and the like of the beams. As the exemplary device (for example, the exemplary computing device 320 shown in FIGS. 3A-3B) moves from the unfolded configuration to the folded configuration, each of the beams 1, 2, 4 and 5 rotates about an individual, respective center of rotation X, to support and guide the bending movement of the foldable layer 322. Determination of a center of rotation of the second beam 2 will be described in more detail with respect to FIGS. 4B through 4E.

Figure 4C:
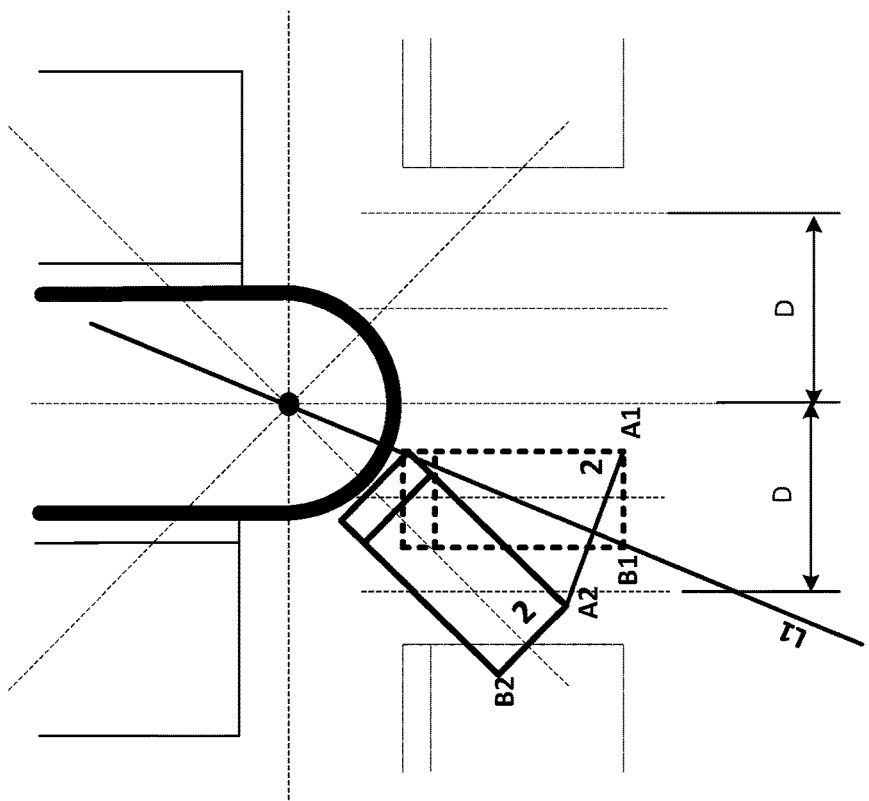
Figure 4B:
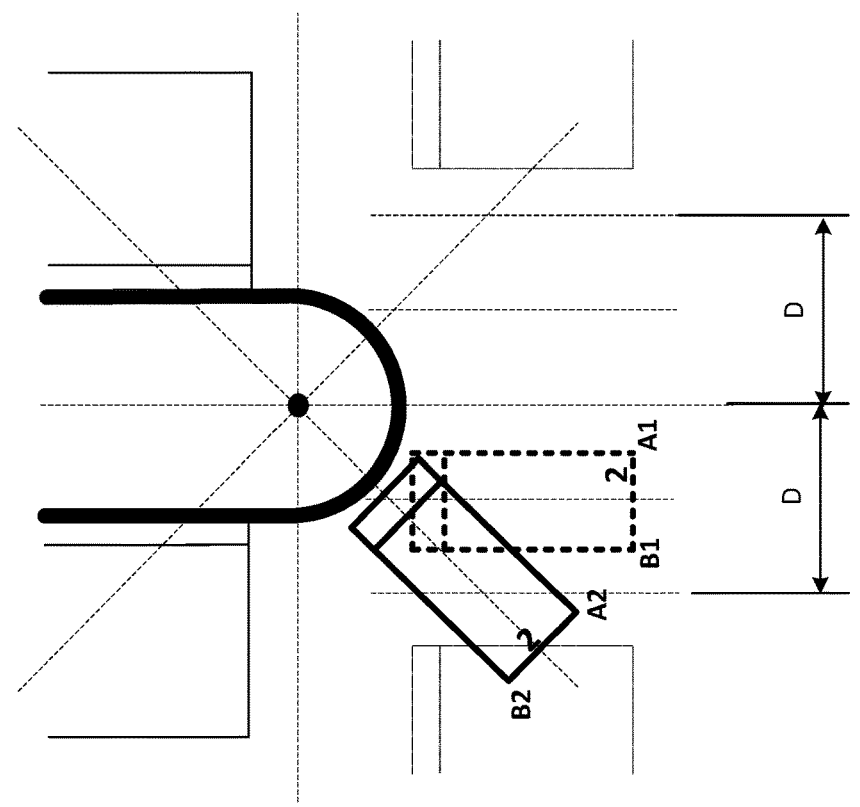
Figure 4E:
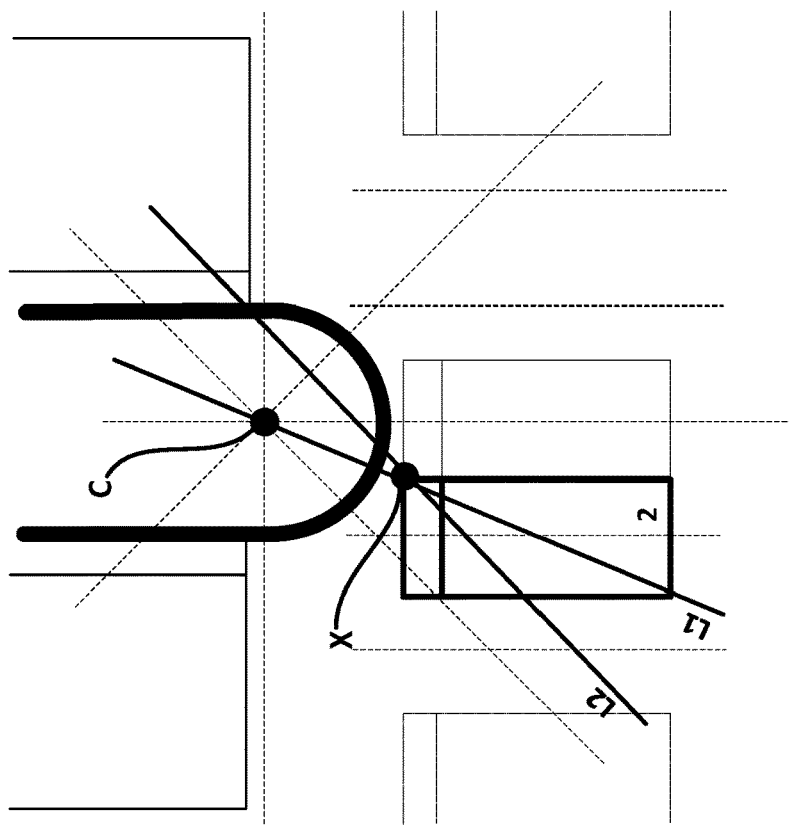
Figure 4D:
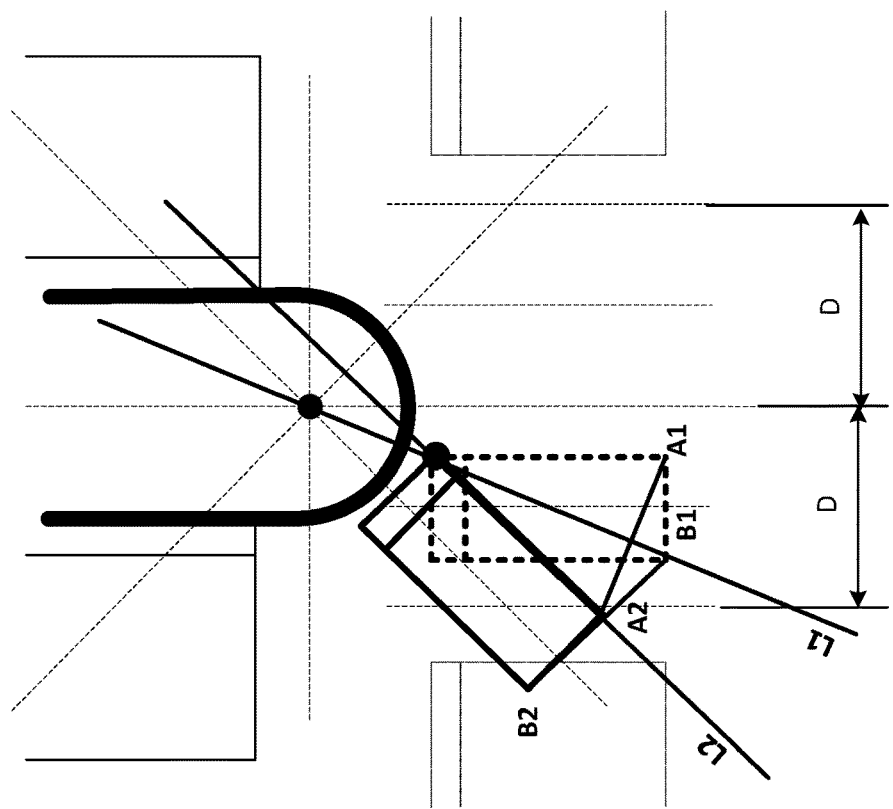

As shown in FIG. 4B, reference points A and B may be designated on the beam 2, for example, at opposite end/corner portions of a rotating end of the beam 2. In rotating the beam 2 from an initial position (shown in dotted lines), through an angle θ (in this example, approximately 45 degrees, based on the number of beams and number of rotational axes, as described above) to a final position (shown in solid lines), the first reference point moves from an initial position A1 to a final position A2. Similarly, the second reference point moves from an initial position B1 to a final position B2. As shown in FIG. 4C, a line A1-A2 is drawn connecting the points A1 and A2, and a first line L1, bisecting the line A1-A2, is drawn. As shown in FIG. 4D, a line B1-B2 is drawn connecting the points B1 and B2, and a second line L2, bisecting the line B1-B2, is drawn. The point X at which the first line L1 and the second line L2 intersect defines the center of rotation X of the beam 2, as shown in FIG. 4E.

As noted above, the process described above with respect to FIGS. 4A through 4E may be applied similarly to the remaining beams 1, 4, and 5, to determine a respective center of rotation for each of the individual beams, 1, 4 and 5. As noted above, in this example, the multi-axis hinge mechanism divides the bending area of the computing device, corresponding to the bendable section of the foldable layer, into 5 beams, defining four individual centers/axes of rotation, each rotating approximately 45 degrees. A hinge mechanism, in accordance with implementations described herein, may include more, or fewer beams, and more, or fewer, axes of rotation.

In the example shown in FIGS. 4A and 4B, the exemplary reference points A and B are positioned at corners of beam, simply for ease of discussion and illustration. However, in some implementations, other reference points may be selected, and the process described above may be used to determine the center of rotation X of the respective beam.

Figure 5A:
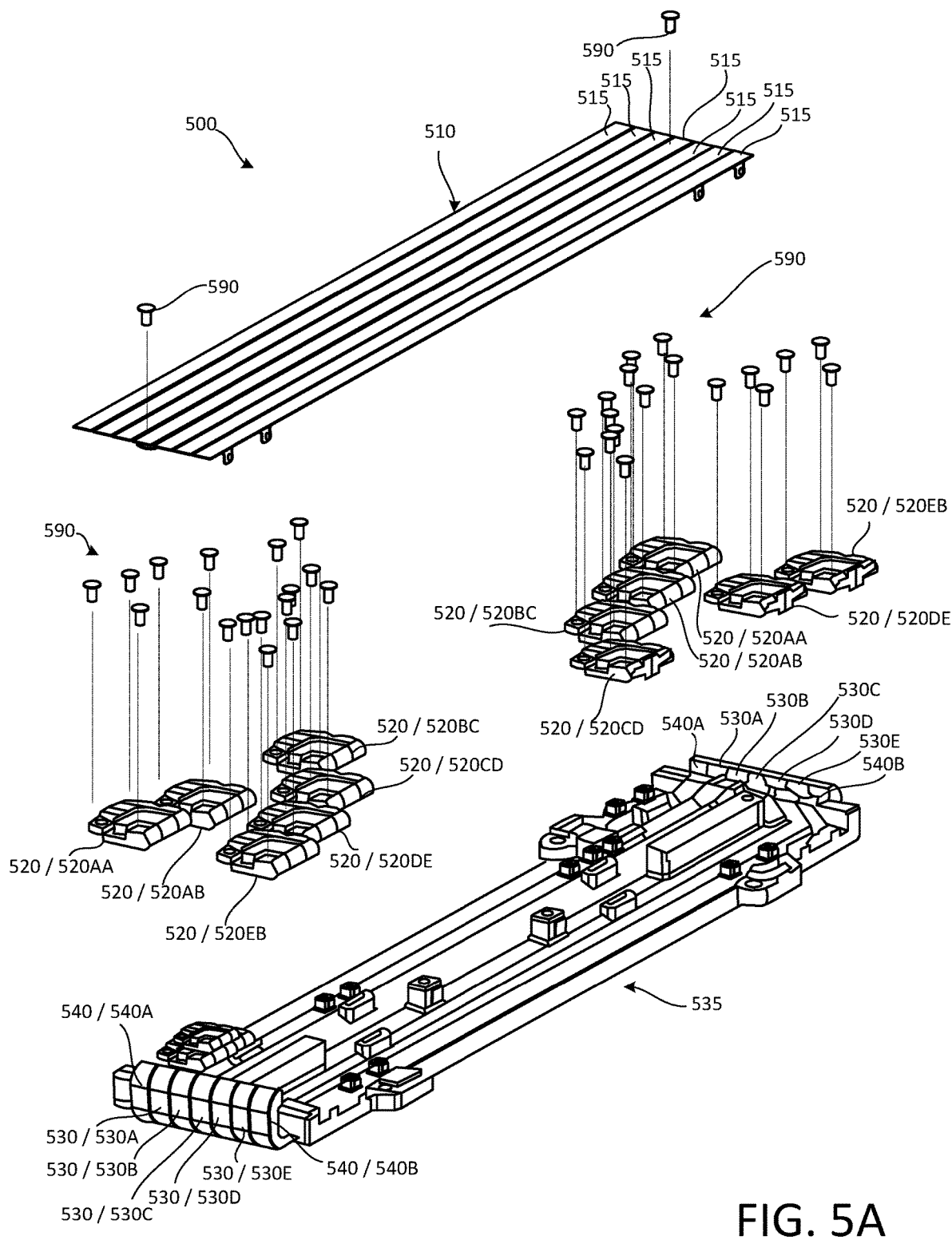
FIGS. 5A and 5C show exploded perspective views.
Figure 5B:
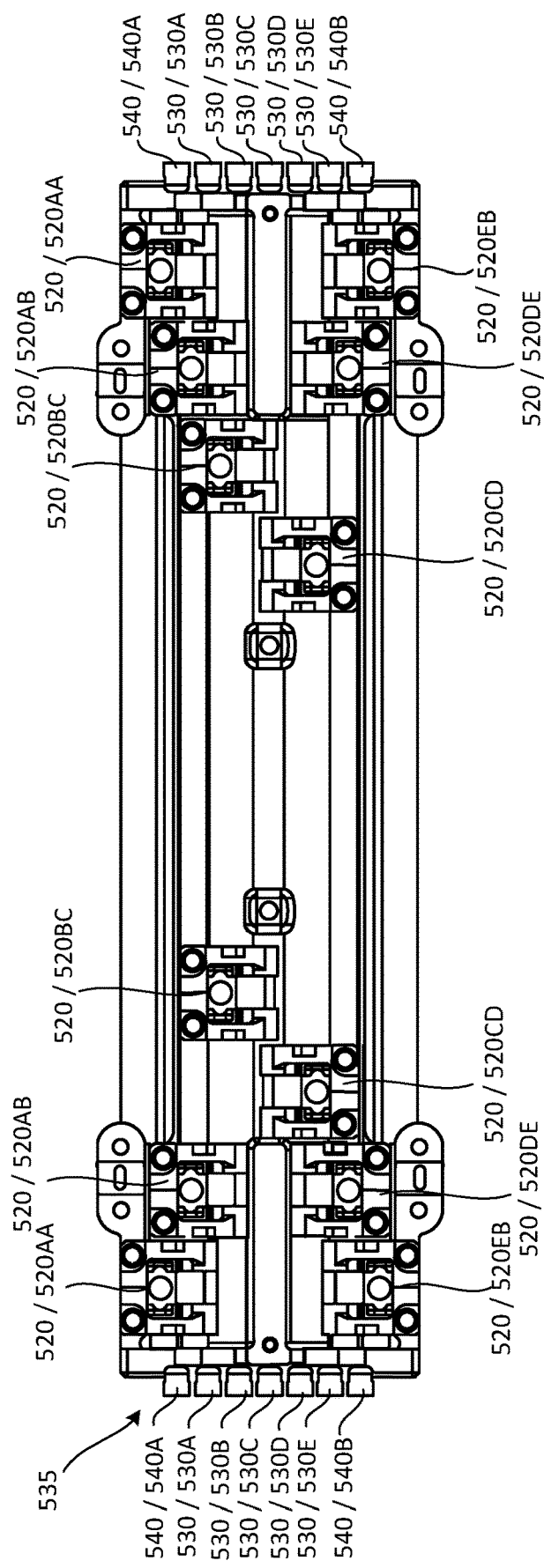
FIGS. 5B and 5D are assembled top views, of an exemplary hinge mechanism, in accordance with implementations described herein.

FIG. 5A shows an exploded perspective view of an exemplary hinge mechanism 500. FIG. 5B shows an assembled top view of the exemplary hinge mechanism 500 of FIG. 5A, without a hinge cover 510 shown in FIG. 5A.

As shown in FIGS. 5A and 5B, the exemplary hinge mechanism 500 includes a hinge beam module 535 including a plurality of hinge segments 530, or hinge beams 530. In the example shown in FIGS. 5A and 5B, the exemplary hinge mechanism 500 includes five exemplary hinge beams 530A, 530B, 530C, 530D and 530E, simply for purposes of discussion and illustration. The hinge mechanism 500, in accordance with implementations described herein, may include more, or fewer, hinge beams 530. In the example shown in FIGS. 5A and 5B, the five exemplary hinge beams 530A through 530E are each defined by a body that extends longitudinally along a length of the respective hinge beam 530A-530E, with the plurality of hinge beams 530A-530E are arranged side by side in a row. In some implementations, hinge beam brackets 540 couple the arrangement of hinge beams 530 to corresponding portions of a housing, such as, for example, the housing of the exemplary computing device 200 shown in FIGS. 2A and 2B. In the example shown in FIGS. 5A and 5B, a first hinge beam bracket 540A is coupled to the hinge beam 530A at a first end of the arrangement of hinge beams 530, to couple the arrangement of hinge beams 530 to, for example, the first body 240A, or first housing 240A of the exemplary computing device 200. Similarly, in the example shown in FIGS. 5A and 5B, a second hinge beam bracket 540B is coupled to the hinge beam 530E at a second end of the arrangement of hinge beams 530 to couple the arrangement of hinge beams 530 to, for example, the second body 240B, or second housing 240B of the exemplary computing device 200.

A plurality of hinge track modules 520 may be coupled to the hinge beams 530 by, for example, a plurality of fasteners 590. In some implementations, the fasteners 590 are, for example, threaded fasteners 590 such as, for example, screws 590. In some implementations, other types of fasteners couple the hinge track modules 520 to the hinge beams 530. In some implementations, each hinge track module 520 couples an adjacent pair of hinge beams 530. For example, each hinge track module may provide for the movable coupling of an adjacent pair of hinge beams 530. In the exemplary arrangement shown in FIGS. 5A and 5B, a first hinge track module 520AA has a first portion thereof coupled to the first hinge beam bracket 540A and a second portion thereof coupled to the first hinge beam 530A to couple the first hinge beam bracket 540A and the first hinge beam 530A. Similarly, a second hinge track module 520AB has a first portion thereof coupled to the first hinge beam 530A and a second portion thereof coupled to the second hinge beam 530B to couple the first hinge beam 530A and the second hinge beam 530B; a third hinge track module 520BC has a first portion thereof coupled to the second hinge beam 530B and a second portion thereof coupled to the third hinge beam 530C to couple the second hinge beam 530B and the third hinge beam 530C; a fourth hinge track module 520CD has a first portion thereof coupled to the third hinge beam 530C and a second portion thereof coupled to the fourth hinge beam 530D to couple the third hinge beam 530C and the fourth hinge beam 530D; a fifth hinge track module 520DE has a first portion thereof coupled to the fourth hinge beam 530D and a second portion thereof coupled to the fifth hinge beam 530E to couple the fourth hinge beam 530D and the fifth hinge beam 530E; and a sixth hinge track module 520EB has a first portion thereof coupled to the fifth hinge beam 530E and a second portion thereof coupled to the second hinge beam bracket 540B to couple the fifth hinge beam 530E and the second hinge beam bracket 540B.

In some implementations, a hinge cover 510 is be coupled to the arrangement of hinge beams 530. In some implementations, the hinge cover 510 includes a plurality of hinge cover segments 515 corresponding to the hinge brackets 540 and the hinge beams 530. In some implementations, fasteners 590, such as, for example, threaded fasteners, couple the hinge cover 510 to the hinge beams 530.

Figure 6B:
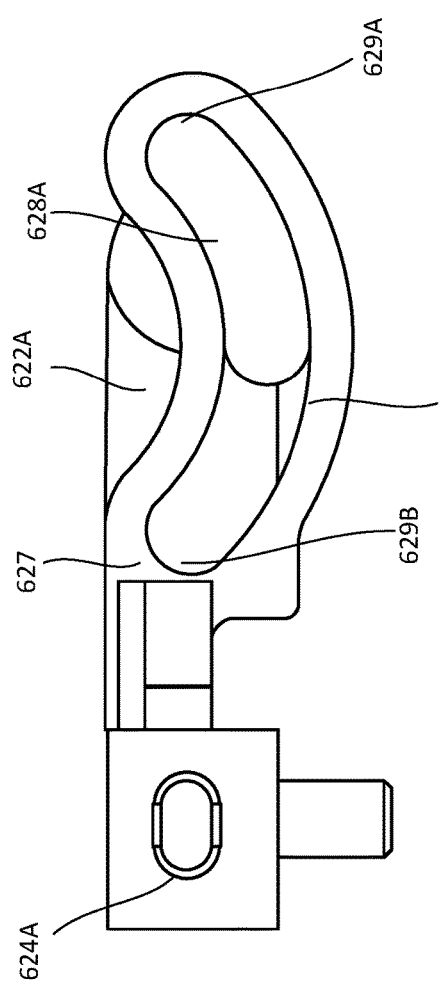
FIGS. 6B and 6C show side views of the hinge track module shown in FIG. 6A, in accordance with implementations described herein.
Figure 6C:
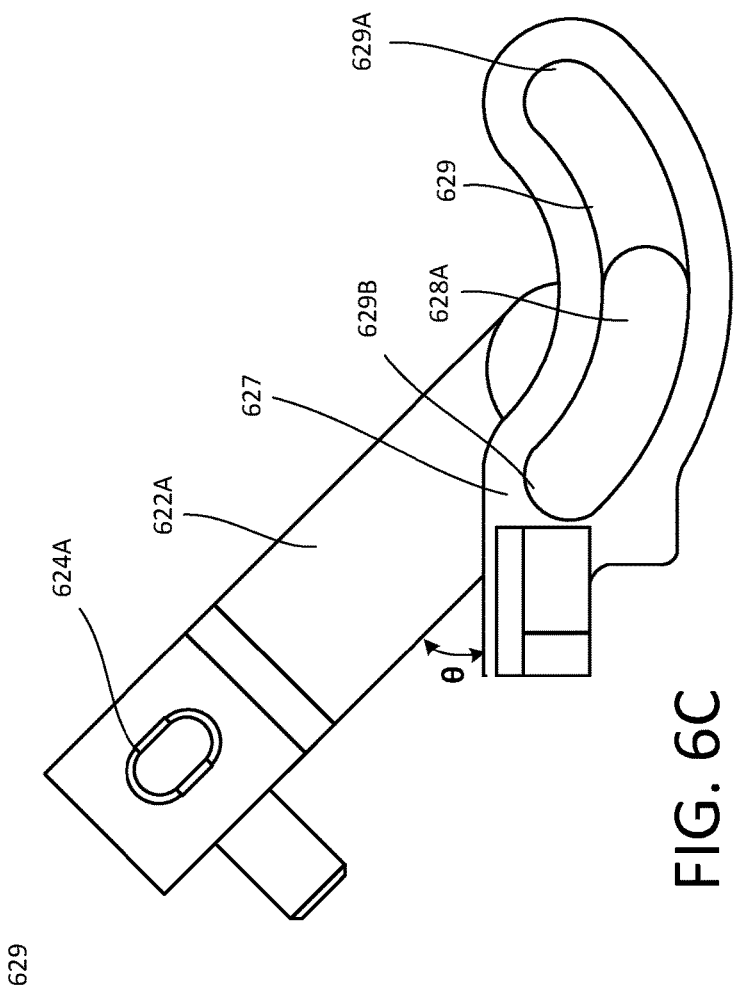

FIG. 6A shows an exploded perspective view of one of the hinge track modules 520. FIG. 6B shows a side view of the hinge track module 520 in the unfolded configuration, with a first hinge shaft member removed, so that interaction between the remaining hinge shaft member and a hinge track member is visible. FIG. 6C shows a side view of the hinge track module in the folded configuration, with the first hinge shaft member removed, so that interaction between the remaining hinge shaft member and a hinge track member is visible.

Each hinge track module 520 may include a pair of hinge shaft members 621 coupled to a hinge track member 623. In particular, the hinge track member 623 is positioned between a first hinge shaft member 621A and a second hinge shaft member 621B. A track 629 is defined in a body 627 of the hinge track member 623. The track 629 is defined by a slot that extends partially through, or fully through, the body 627 of the hinge track member 623. One or more fasteners 590 (not shown in FIG. 6A) extend through one or more corresponding openings 625 in the hinge track member 623, to couple, for example, fixedly couple, the hinge track member 623 to a corresponding hinge bracket 540, or a corresponding hinge beam 530, of the hinge beam module 535.

The first hinge shaft member 621A includes a hinge shaft 628A extending outward from a first end portion of a body 622A of the first hinge shaft member 621A. The hinge shaft 628A of the first hinge shaft member 621A may be received in the track 629 formed in the hinge track member 623. The hinge shaft 628A may be movably, for example, slidably, received in the track 629, to movably couple the first hinge shaft member 621A to the hinge track member 623. A protrusion 624A may extend outward from a second end portion of the body 622A of the first hinge shaft member 621A. A fastener 590 may extend through an opening 626A formed in the second end portion of the body 622A, to couple, for example, fixedly couple the first hinge shaft member 621A to a corresponding hinge bracket 540, or a corresponding hinge beam 530, of the hinge beam module 535.

Similarly, the second hinge shaft member 621B may include a hinge shaft 628B extending outward from a first end portion of a body 622B of the second hinge shaft member 621B. The hinge shaft 628B of the second hinge shaft member 621B may be received in the track 629 formed in the hinge track member 623. In particular, the hinge shaft 628B of the second hinge shaft member 621B may be inserted into the track 629 from a second side of the track 629, opposite the first side of the track 629 into which the hinge shaft 628A of the first hinge shaft member 621A is inserted. The hinge shaft 628B of the second hinge shaft member 621B may be movably, for example, slidably, received in the track 629, to movably couple the second hinge shaft member 621B to the hinge track member 623. One or more fasteners 590 may extend through one or more corresponding openings 626B formed in the second end portion of the body 622B, to couple, for example, fixedly, couple the second hinge shaft member 621B to a corresponding hinge bracket 540, or a corresponding hinge beam 530, of the hinge beam module 535.

In some implementations, a pin 624AA formed on the protrusion 624A of the first hinge shaft member 621A is inserted into an opening 624BB formed in the protrusion 624B of the second hinge shaft member 621B, to couple the respective second end portions of the first hinge shaft member 621A and the second hinge shaft member 621B, such that the first hinge shaft member 621A and the second hinge shaft member 621B are fixed to each other and move together. In some implementations, the pin 624AA may be formed on protrusion 624B of the second hinge shaft member 621B, and the opening 624BB may be formed in the protrusion 624A of the first hinge shaft member 621A.

In the unfolded configuration shown in FIG. 6B, the hinge shaft 628A of the first hinge shaft member 621A (and the hinge shaft 628B of the second hinge shaft member 621B, not shown in FIG. 6B) is positioned at a first end portion 629A of the track 629. In the exemplary arrangement shown in FIG. 6B, the hinge shaft 628A (and the hinge shaft 628B) abuts the first end portion 629A of the track 629. The positioning of the hinge shafts 628 of the hinge shaft modules 621 against the first end portion 629A of the track 629 defines a first stopping mechanism that restricts further sliding movement of the hinge shafts 628 in the unfolding direction. For example, this first stopping mechanism prevents further unfolding of the hinge mechanism 500 (and the computing device 200 including the foldable display 202) beyond a maximum bending radius, such as, for example, beyond approximately 180 degrees.

In the folded configuration shown in FIG. 6C, the hinge shaft 628A of the first hinge shaft member 621A (and the hinge shaft 628B of the second hinge shaft member 621B, not shown in FIG. 6C) is positioned at a second end portion 629B of the track 629. In the exemplary arrangement shown in FIG. 6C, the first hinge shaft member 621A (and the second hinge shaft member 621B, not shown in FIG. 6C) has rotated by an angle θ relative to the hinge track module 623, guided by the sliding movement of the hinge shaft 628A (and the hinge shaft 628B, not shown in FIG. 6C) in the track 629. In this exemplary implementation of a 4-axis hinge mechanism (including five exemplary hinge beams 530), each of the four axes may provide for approximately one fourth of the rotation, or, in this example, approximately 45 degrees.

In some implementations, an outer peripheral shape of the hinge shafts 628 may correspond to an inner peripheral shape of the track 629, to allow the hinge shafts 628A, 628B to slide within the track 629. For example, an arcuate outer contour, or a circular outer contour, corresponding to the inner contour of the track 629, may allow the hinge shafts 628A, 628B to slide easily within the track 629, between the first and second ends 629A, 629B of the track 629. In some situations, hinge shafts 628 having a circular cross section, or a circular outer contour, or a circular outer peripheral shape, would allow for unwanted rotation of the hinge shafts 628A, 628B within the track 629, even when abutting, or stopped against the first or second end 629A, 629B of the track 629. In the examples shown in FIGS. 6A-6C, the hinge shafts 628A, 628B are elongated, or oblong, but with a circular, or arcuate, outer peripheral contour. In this arrangement, an outer peripheral contour of the elongated/oblong hinge shafts 628 corresponds to an inner peripheral contour of the track 629 formed in the track member 623, so that the track 629 guides the sliding movement of the hinge shafts 628 between the first and second ends 629A, 629B of the track 629, as shown in FIGS. 6B and 6C. The elongated, or oblong, arcuate cross-sectional shape of the hinge shafts 628A, 628B received in the track 629 defines an anti-rotation mechanism, which restricts rotation of the hinge shafts 628A, 628B in the track 629, and which prevents unintentional rotation, and in particular, over-rotation, of the hinge shaft modules 621 with respect to the track module 623, and resulting over-rotation of the adjacent hinge beams 530.

As noted above, in the exemplary arrangement shown in FIG. 6C, the hinge shaft 628A (and the hinge shaft 628B) abuts the second end portion 629B of the track 629. The positioning of the hinge shafts 628 of the hinge shaft modules 621 against the second end portion 629B of the track 629 defines a second stopping mechanism that restricts further sliding movement of the hinge shafts 628 in the folding direction. For example, this second stopping mechanism prevents further folding of the hinge mechanism 500 (and the computing device 200 including the foldable display 202), preventing a folding of the foldable display 202 to a bending radius that is less than the allowable bending radius of the foldable display 202.

In some implementations, the contour of the track 629 corresponds to a desired folding and an unfolding motion of the adjacent hinge beams 530/hinge beam brackets 540 to which the hinge track module 520 is coupled. Characteristics such as, for example, a size, a shape, a length and the like of the track 629 may guide the relative movement of the adjacent hinge beams 530/hinge beam brackets 540 to which the hinge track module 520 is coupled, and restrict the folding and unfolding motion of the hinge mechanism 500 (and the computing device 200/foldable display 202), to maintain the foldable display 202 within allowable bending limits.

Figure 7A:
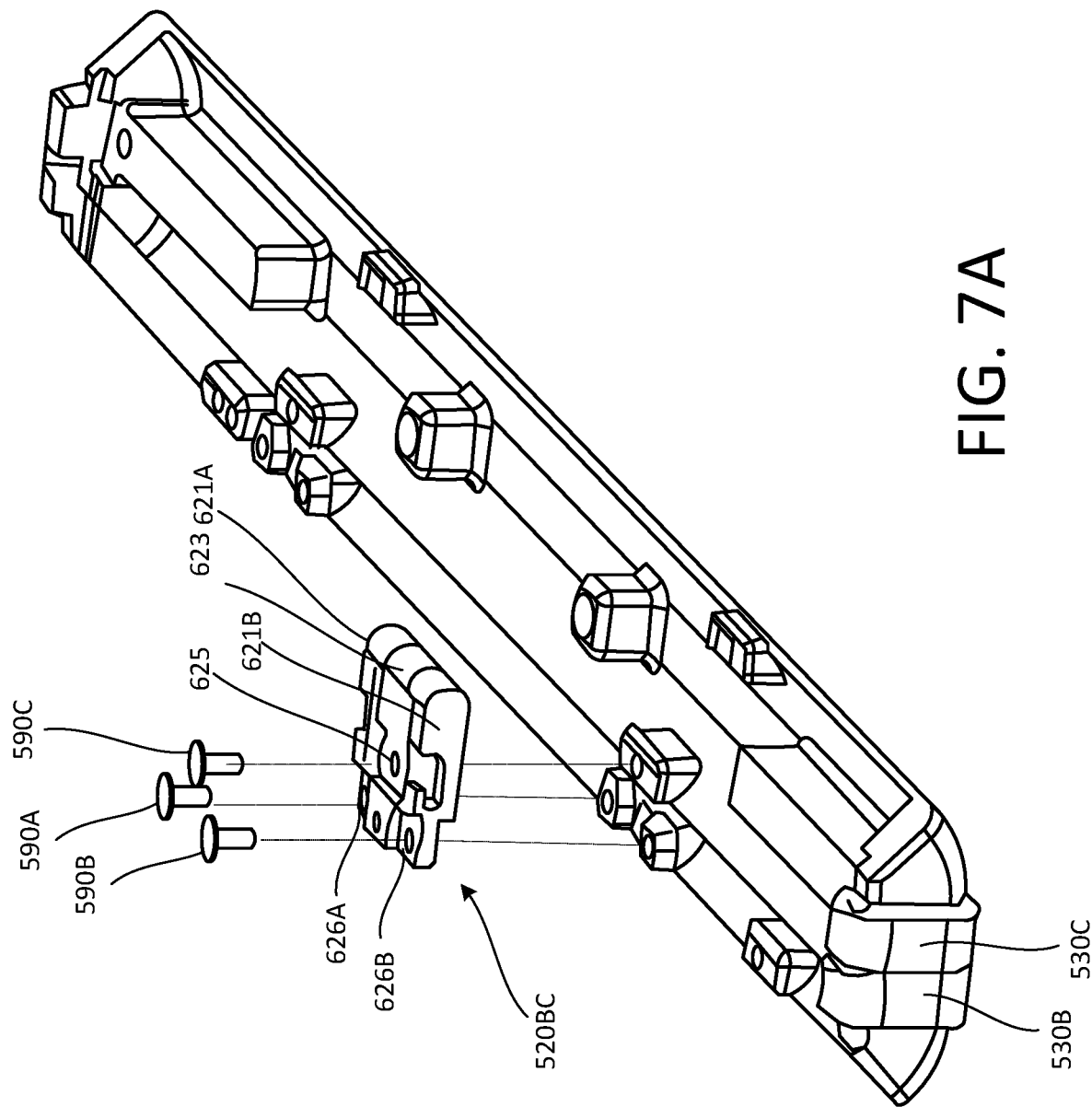
FIGS. 7A-7C illustrate the coupling of the exemplary hinge track module to exemplary hinge beams, in accordance with implementations described herein.

FIG. 7A illustrates installation of one of the plurality of hinge track modules 520 to an adjacent pair of hinge beams 530. In particular, FIG. 7A illustrates the coupling of the third hinge track module 520BC to the second hinge beam 530B and the third hinge beam 530C, simply for purposes of discussion and illustration. Each of the remaining hinge track modules 520 may be coupled to the respective pairs of adjacent hinge beams 530/hinge beam brackets 540 as noted above, in a similar manner.

Figure 7B:
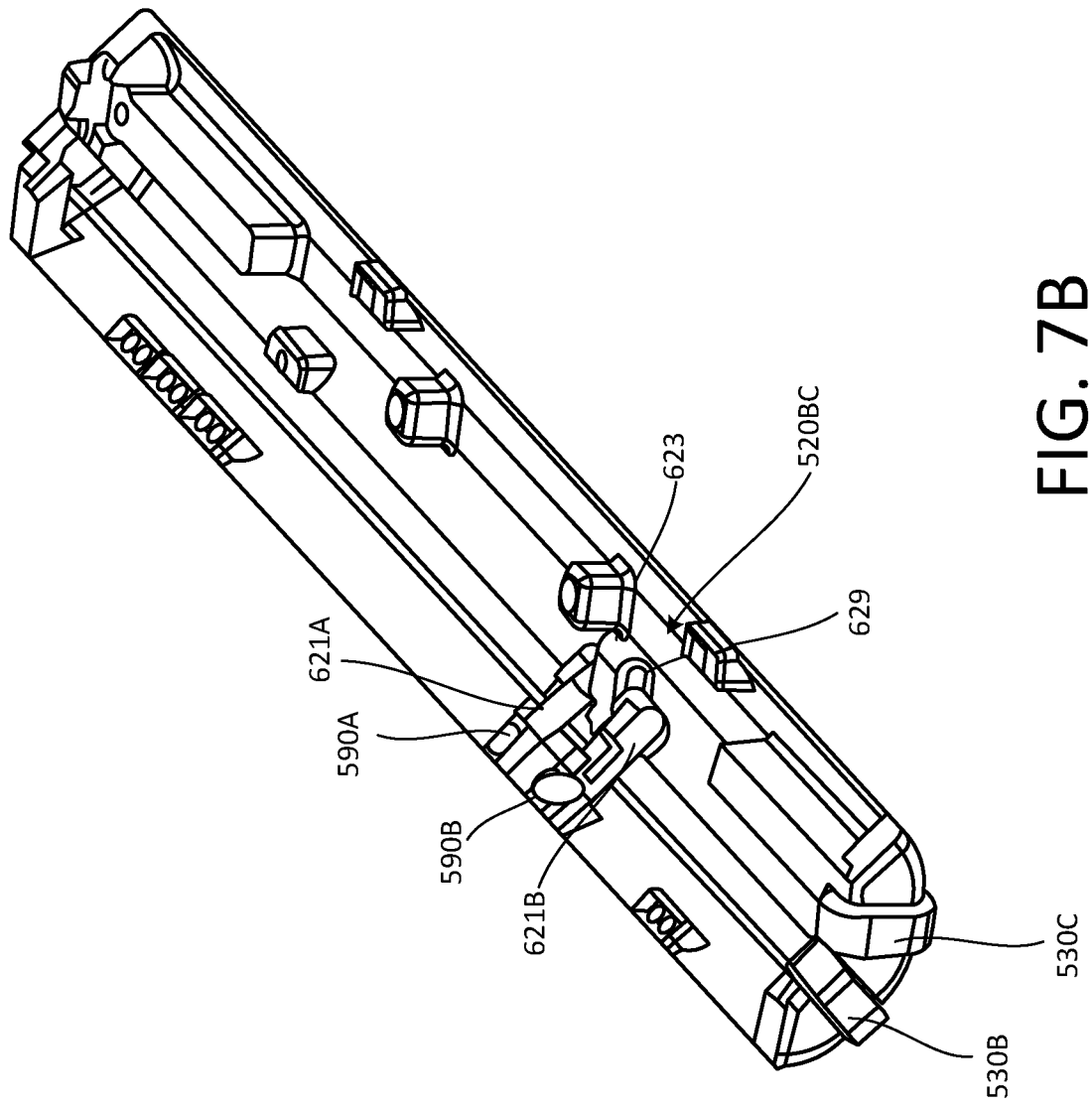

As shown in FIG. 7A, a first fastener 590A is inserted through the opening 626A in the first hinge shaft member 621A and into the second hinge beam 530B, and a second fastener 590B is inserted through the opening 626B in the second hinge shaft member 621B and into the second hinge beam 530B, to couple the first and second hinge members 621A/621B of the hinge track module 520BC to the hinge beam 520B. A third fastener 590C may be inserted through the opening 625 in the hinge track member 623 and into the third hinge beam 530C, to couple the hinge track member 623 to the hinge beam 520C. In this manner, with the first and second hinge shaft members 621A, 621B are fixed to the hinge beam 530B and move together with the hinge beam 530B. With the hinge shaft members 621 of the hinge shaft module 520BC coupled to the (second) hinge beam 530B, and the hinge track member 623 coupled to the (third) hinge beam 530C, the adjacent (second and third) hinge beams 530B, 530C are movably coupled. The hinge shafts 628A, 628B slide in the track 629 as described above, to guide a folding and an unfolding motion of the (second and third) hinge beams 530B, 530C. The second and third hinge beams 530B, 530C, coupled by the third hinge track module 520BC, are shown in the rotated, or folded, configuration in FIG. 7B.

In a similar manner, the remaining hinge track modules 520 may be coupled to the respective adjacent pairs of hinge beam brackets 540/hinge beams 530. For example, in a similar manner, the first hinge track module 520AA couples the first hinge beam bracket 540A and the first hinge beam 530A, the second hinge track module 520AB couples the first and second hinge beams 530A, 530B; the fourth hinge track module 520CD couples the third and fourth hinge beams 530C, 530D; the fifth hinge track module 520DE couples the fourth and fifth hinge beams 530D, 530E; and the sixth hinge track module 520EB couples the fifth hinge beam 530E and the second hinge beam bracket 540B. The plurality of hinge track modules 520 coupled to the arrangement of hinge beams 530 forming the hinge beam module 535 is shown in FIG. 5B.

Figure 5C:
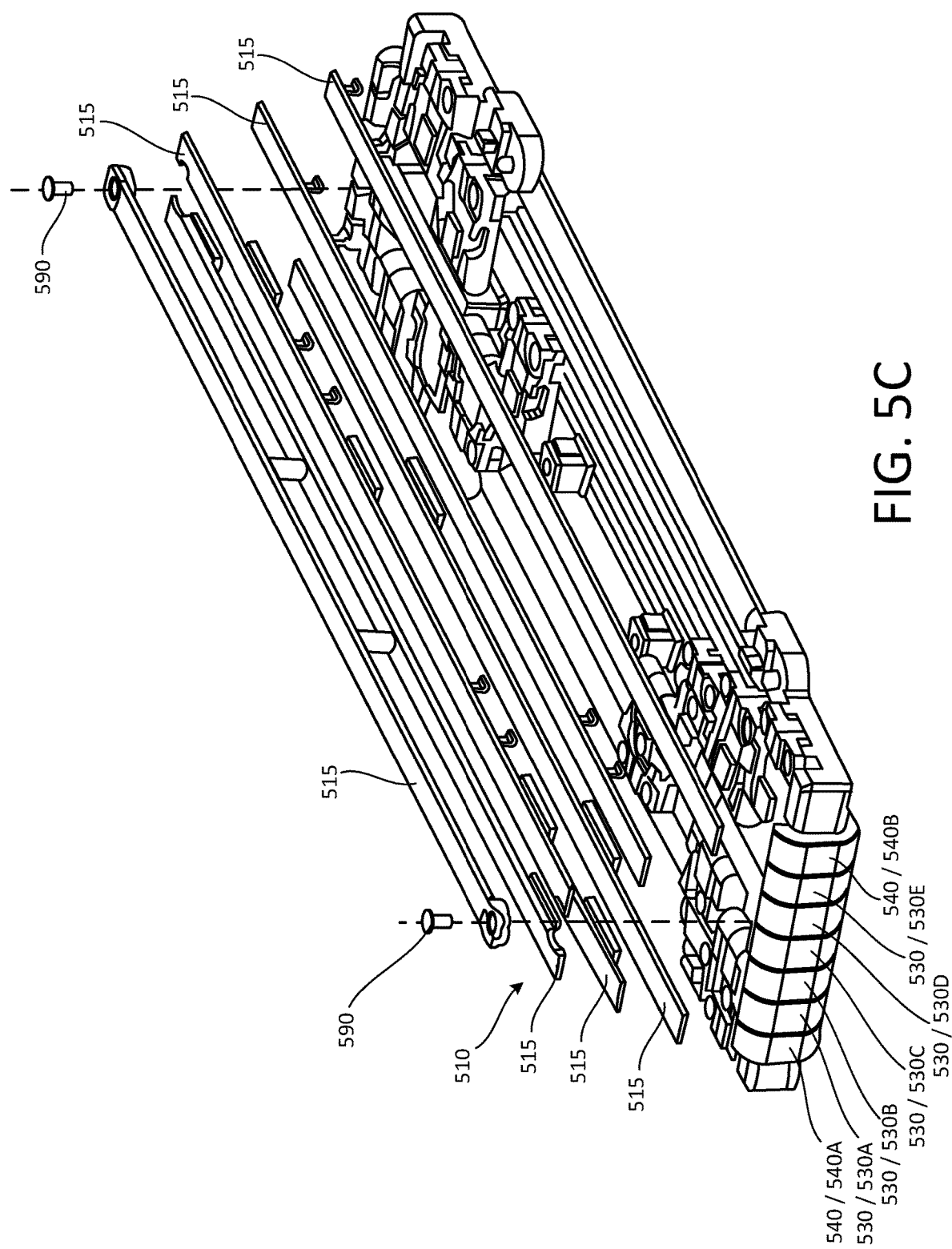
Figure 5D:
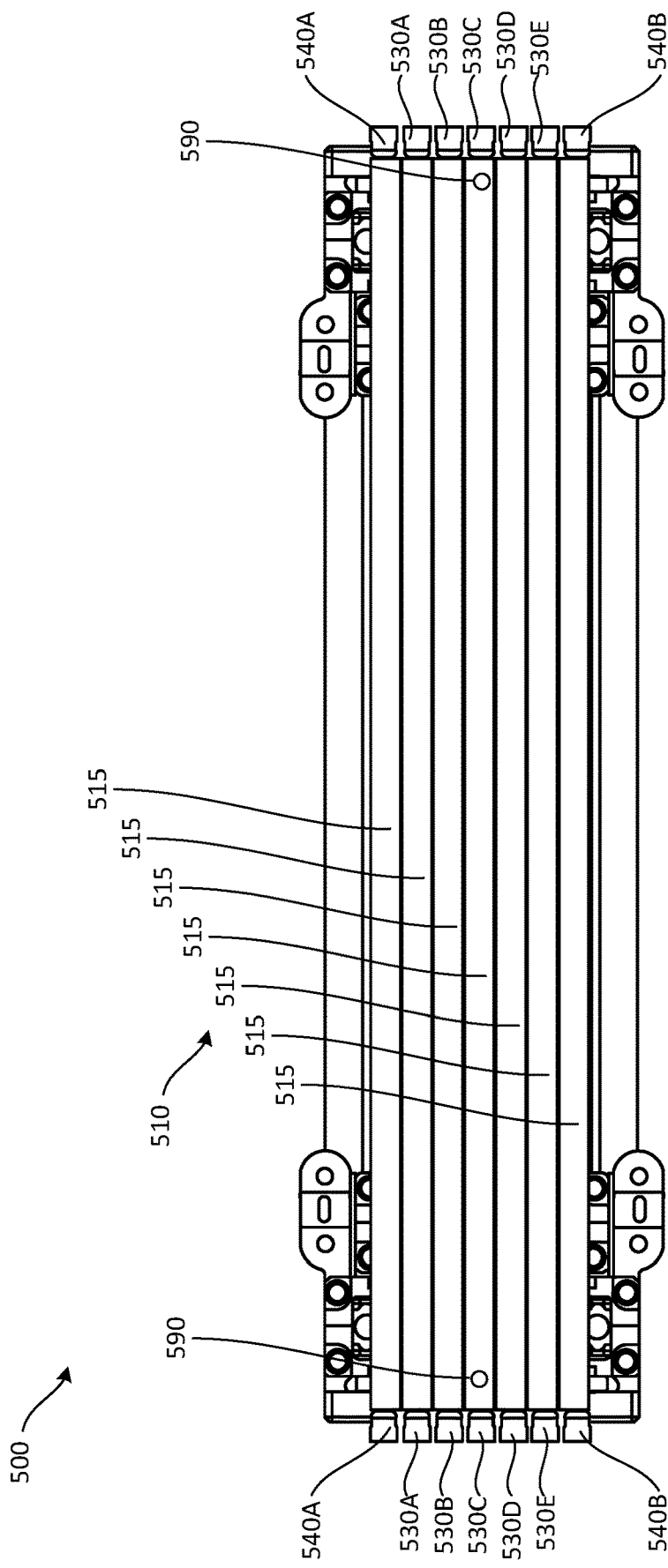

With the plurality of hinge track modules 520 coupled to the arrangement of hinge beams 530 as described above, the hinge cover 510, including the plurality of hinge cover segments 515, may be coupled to the assembled hinge beam module 535s, as illustrated in the exploded perspective view of the exemplary hinge mechanism 500 shown in FIG. 5C, and in the assembled top view of the exemplary hinge mechanism 500 shown in FIG. 5D. The hinge cover 510 including the plurality of hinge cover segments 515 may provide a relatively planar surface, in the unfolded configuration, to provide support for the bendable section 216 of the foldable display 202 in the unfolded configuration. That is, the relatively planar surface defined by the plurality of cover segments 515 of the hinge cover 510 extends across gaps which would otherwise be formed between supporting structure provided by the (uncovered) hinge beam module 535 (FIG. 5B). The hinge cover 510 provides relatively rigid, planar support for the bendable section 216 of the foldable display 202 in the unfolded configuration.

The hinge shafts 628 of the hinge shaft members 621 of each of the plurality of hinge track modules 520 slide within the track 629 of the respective hinge track member 623, to guide the folding and unfolding motion of respective pairs of adjacent hinge brackets 540/hinge beams 530 to which they are coupled.

Figure 7C:
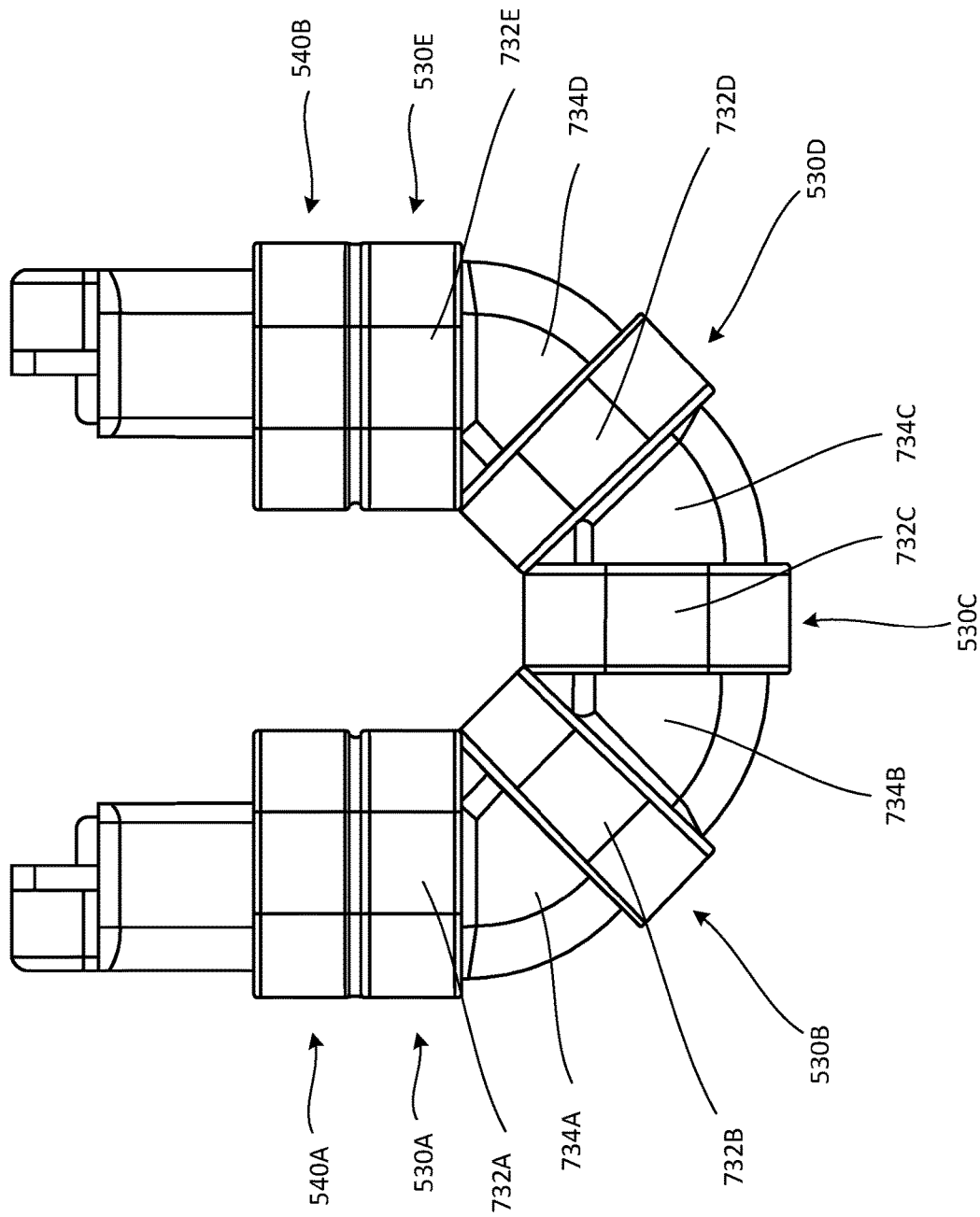

FIG. 7C shows a side view of the assembled hinge mechanism 500 in the folded configuration, with the plurality of hinge beams 530 coupled by the plurality of hinge track modules 520 in this manner.

In some implementations, one or more of the hinge beams 530 include wings 734A, 734B, 734C, 734D, 732E that extend outward from opposite sides of respective bodies 732A, 732B, 732C, 732D, 732E of the respective hinge beam 530A, 530B, 530C, 530D, 530E. The wings 734A, 734B, 734C, 734D, 732E extend between adjacent hinge beams 530A, 530B, 530C, 530D, 530E in the unfolded configuration, to cover gaps between the adjacent hinge beams 530A, 530B, 530C, 530D, 530E in the folded configuration. The wings 734A, 734B, 734C, 734D, 734E provide a finished external appearance in the folded configuration. The wings 734A, 734B, 734C, 734D, 734E also prevent debris from entering gaps G between adjacent hinge beams 530A, 530B, 530C, 530D, 530E in the folded configuration. The wings 734A 734B, 734C, 734D, 734E are nested within the bodies 732A, 732B, 732C, 732D, 732E of the adjacent hinge beam 530A, 530B, 530C, 530D, 530E in the unfolded configuration.

Figure 8A:
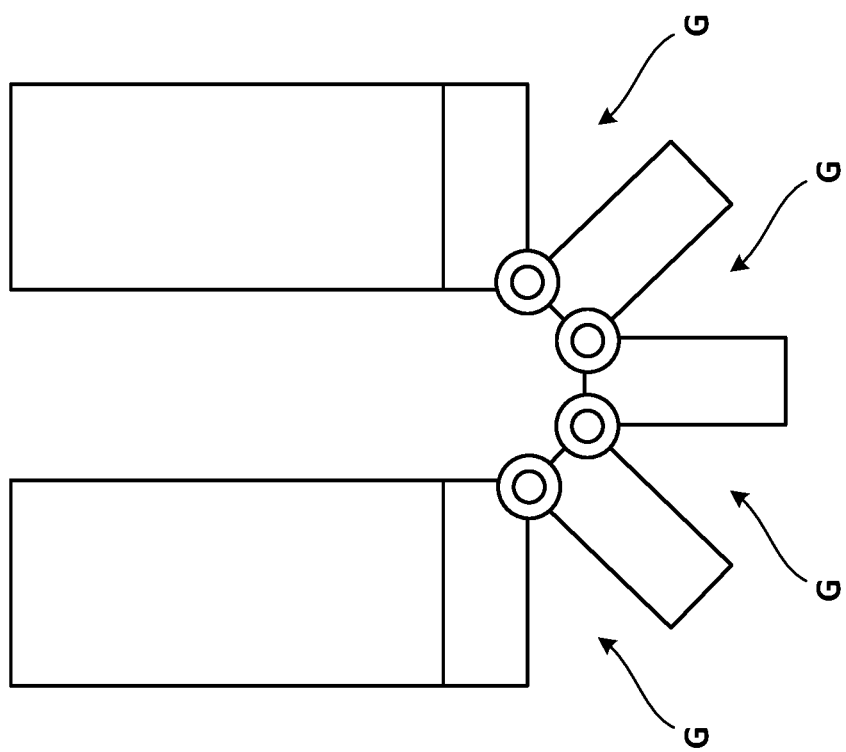
FIG. 8A is a schematic illustration of an exemplary hinge mechanism in a folded configuration.
Figure 8C:
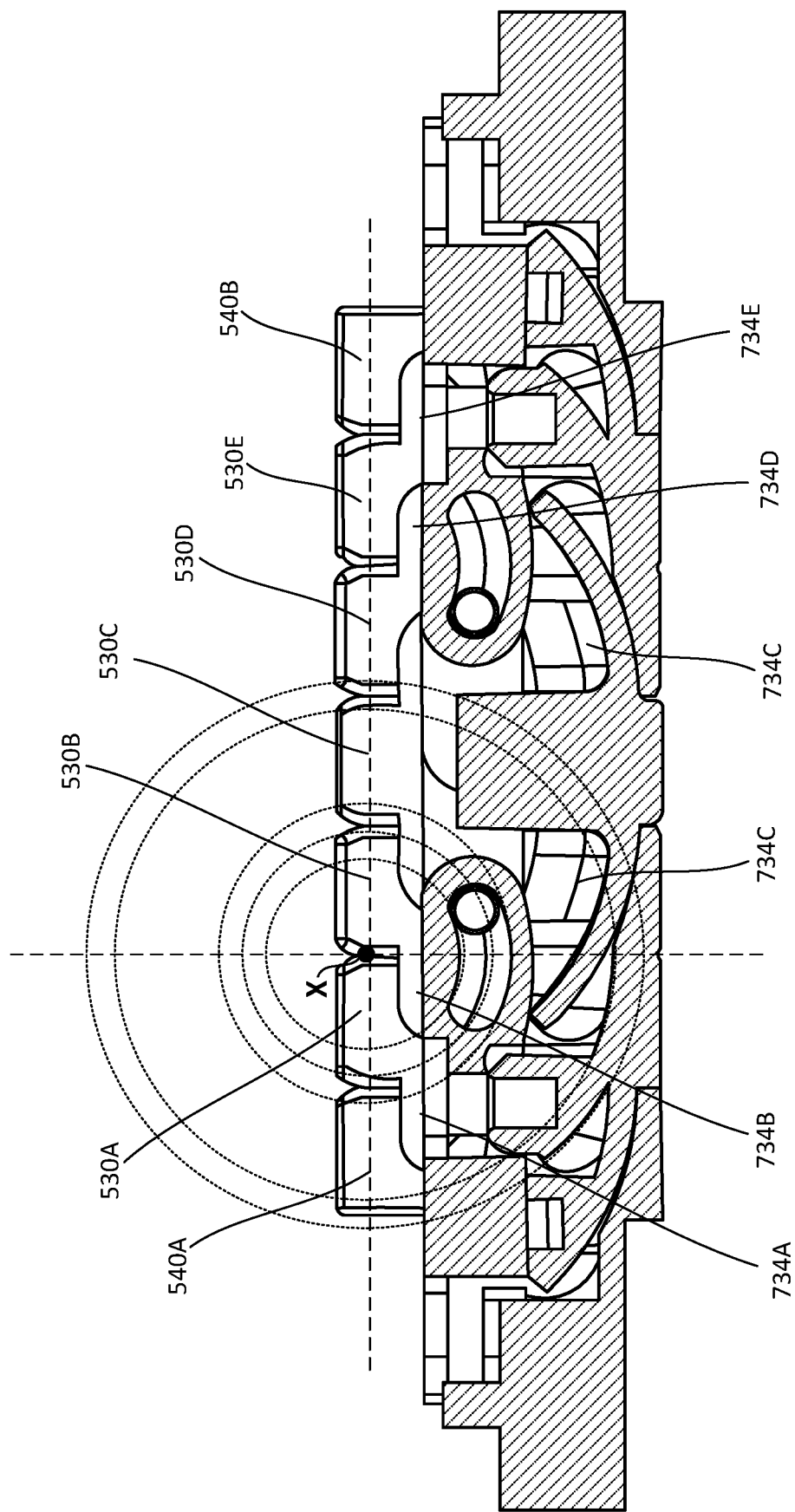

The gaps G are illustrated schematically in FIG. 8A. FIG. 8B is a cross sectional view of the hinge mechanism 500, illustrating the wings 732A, 732B, 732C, 732D, 732E in the folded configuration, and FIG. 8C is a cross-sectional view of the hinge mechanism 500, illustrating the wings 732A, 732B, 732C, 732D, 732E in the unfolded configuration. As shown in FIG. 8C, the wings 732A, 732B, 732C, 732D, 732E have an arcuate contour that follows the rotation of the hinge beam 530. That is, the contour of each wing 732A, 732B, 732C, 732D, 732E (or, set of wings) of a particular hinge beam 530A, 530B, 530C, 530D, 530E follow a concentric circle centered on the center of rotation X for that particular hinge beam 530A, 530B, 530C, 530D, 530E. Similarly, the slots 629 in the hinge track members 623 of the hinge track modules 520 have an arcuate contour, such that the contour of each track 629 follows a concentric circle centered on the center of rotation X for the particular hinge beam 530A, 530B, 530C, 530D, 530E to which it is attached, to guide the folding and unfolding motion of the plurality of hinge beams 530A, 530B, 530C, 530D, 530E. In this manner, the movement of the hinge shafts 628 in the tracks 629, that guides the folding and unfolding motion of the hinge mechanism 500, is coordinated with the extension and retraction of the cover wings 732A, 732B, 732C, 732D, 732E relative to the adjacent hinge beams 530A, 530B, 530C, 530D, 530E.

Figure 9:
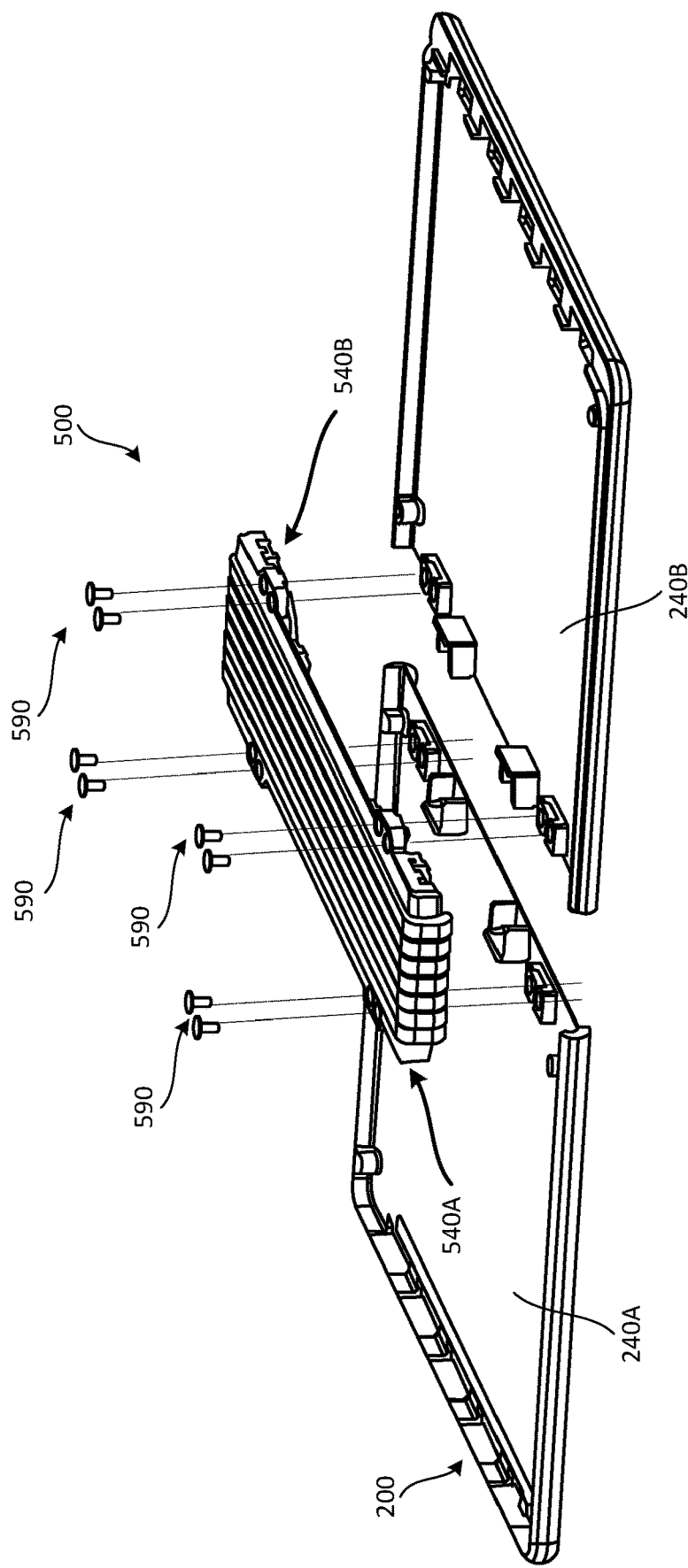
FIG. 9 shows an exploded perspective view of a coupling of a hinge mechanism to a housing of a computing device, in accordance with implementations described herein.

As noted above, the hinge mechanism 500 assembled as described above may be coupled to the housing of a computing device such as the exemplary computing device 200 shown in FIGS. 2A-2B. In the example shown in FIG. 9, the first housing 240A of the computing device 200 is attached to the first hinge beam bracket 540A by, for example, fasteners 590, to couple the first housing 240A to the hinge mechanism 500. Similarly, the second housing 240B of the computing device 200 is attached to the second hinge beam bracket 540B by, for example, fasteners 590, to couple the second housing 240B to the hinge mechanism 500.

Figure 10C:
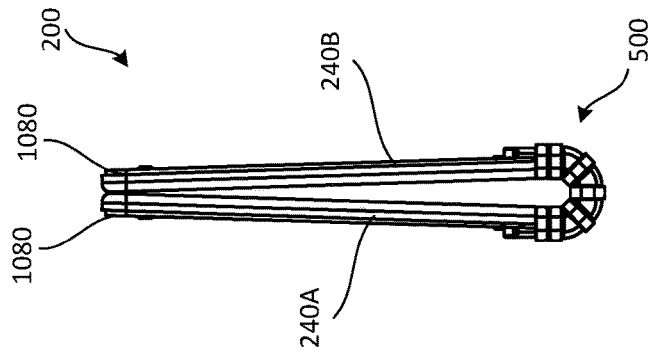
FIG. 10C is a side view of the computing device including the hinge mechanism, in a folded configuration, in accordance with implementations described herein.
Figure 10A:
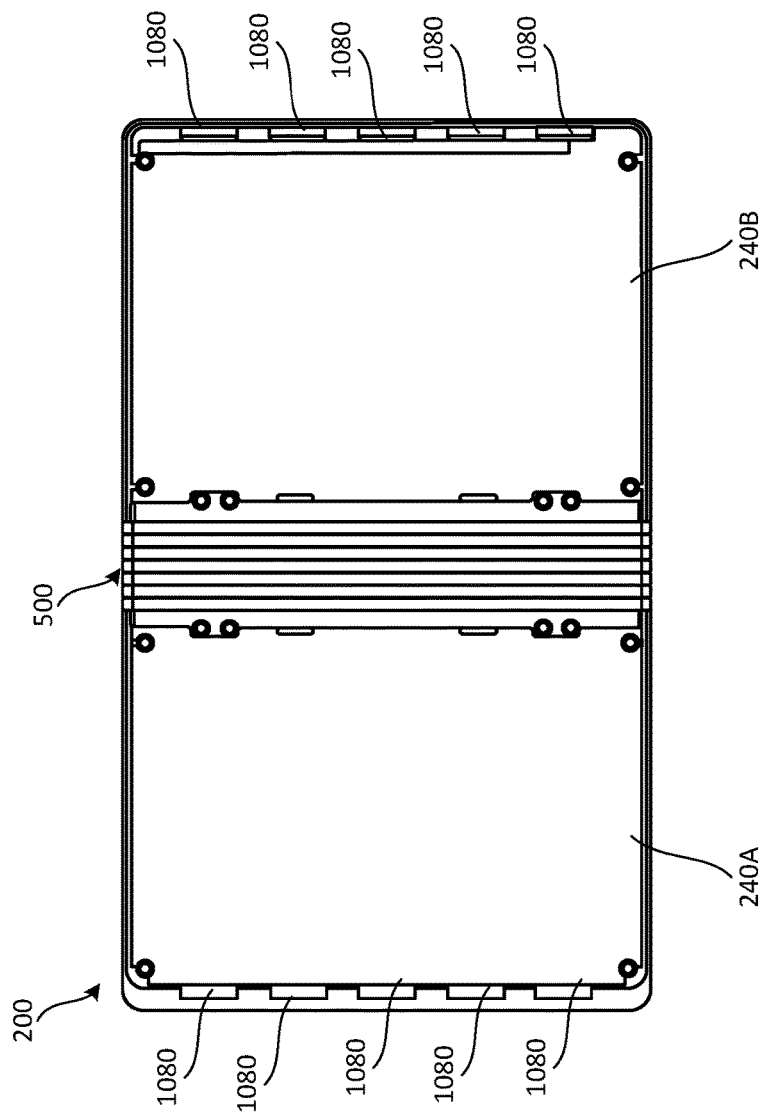
FIG. 10A shows a top view.
Figure 10B:
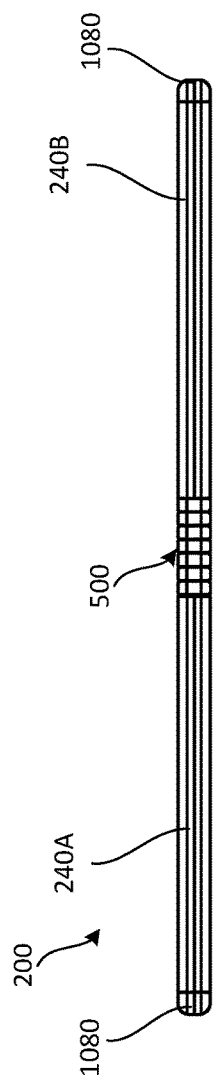
FIG. 10B is a side view, of a computing device including a hinge mechanism, in an unfolded configuration.

In this arrangement, the hinge mechanism 500 provides for a fluid, torque-free motion between the unfolded and folded configurations, while maintaining the foldable display 202 within allowable bending limits. In some implementations, magnets are included in the computing device 202 to, for example, maintain the computing device 202 in the unfolded configuration and/or in the unfolded configuration. That is, due to the lack of mechanical torque mechanisms (which would, for example, hold the first and second housings 240A, 240B in interim positions), magnets provide a mechanism for maintaining the computing device 200 including the foldable display 202 in a desired configuration. For example, as shown in FIGS. 10A-10C, in some implementations, one or more magnets 1080 are provided at corresponding positions along an outer edge portion of the first housing 240A and an outer edge portion of the second housing 240B of the computing device 200. In the folded configuration shown in FIG. 10C, the magnets 1080 can be aligned and exert an attractive force that draws and holds the first and second housings 240A, 240B together in the folded configuration.

In a computing device including a hinge mechanism, in accordance with implementations as described herein, a relatively simple, and relatively reliable hinge mechanism may support the folding and unfolding of a foldable display, with a relatively natural motion, while also providing for planarity of the foldable display in the unfolded configuration, particularly in the bendable section of the foldable display. The hinge mechanism may accomplish this without the use of complicated gearing which add cost and complexity, which produce a relatively unnatural, restrictive folding and unfolding motion, and which may detract from the utility and reliability of the computing device. This relatively simple and reliable hinge mechanism may guide and support the folding and unfolding of the computing device including the foldable display, while still providing support to the foldable display, and while still maintaining the foldable display within allowable bending radius limits.

The devices and apparatuses described herein can be included as part of a computing device, that includes, for example, a processor for executing instructions and a memory for storing the executable instructions. Specific structural and functional details disclosed herein are merely representative for purposes of describing example embodiments. Example embodiments, however, be embodied in many alternate forms and should not be construed as limited to only the embodiments set forth herein.

It is understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It is understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, and an, are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:
1. A hinge mechanism, comprising:
a plurality of hinge beams each extending longitudinally, the plurality of hinge beams being arranged in a row; and
at least one hinge track module, the at least one hinge track module movably coupling an adjacent pair of hinge beams of the plurality of hinge beams, the at least one hinge track module including:
a track member including an arcuate slot formed therein, the arcuate slot having a first end and a second end, the track member being coupled to a first hinge beam of an adjacent pair of hinge beams such that track member moves together with the first hinge beam;
a first hinge shaft member positioned at a first side of the track member, the first hinge shaft member being coupled to a second hinge beam of the adjacent pair of hinge beams such that the first hinge shaft member moves with the second hinge beam, the first hinge shaft member including a first hinge shaft inserted into and movably received into the arcuate slot from the first side of the track member to movably couple the first hinge shaft member and the track member; and
a second hinge shaft member positioned at a second side of the track member, the second hinge shaft member being coupled to the second hinge beam of the adjacent pair of hinge beams such that the second hinge shaft member moves with the second hinge beam, the second hinge shaft member including a second hinge shaft inserted into and moveably received into the arcuate slot from the second side of the track member to movably couple the second hinge shaft member and the track member.

2. The hinge mechanism of claim 1, wherein
the first hinge shaft extends outward from a first end portion of a first body portion of the first hinge shaft member; and
the second hinge shaft extends outward from a first end portion of a second body portion of the second hinge shaft member and into the arcuate slot of the track member.

3. The hinge mechanism of claim 1, wherein, in a folded configuration of the hinge mechanism, the first hinge shaft abuts the first end of the arcuate slot formed in the track member, so as to restrict further sliding of the first hinge shaft in a first direction in the arcuate slot and a corresponding further folding motion of the hinge mechanism.

4. The hinge mechanism of claim 3, wherein, in an unfolded configuration of the hinge mechanism, the first hinge shaft abuts the second end of the arcuate slot formed in the track member so as to restrict further sliding of the first hinge shaft in a second direction in the arcuate slot and a corresponding further unfolding motion of the hinge mechanism.

5. The hinge mechanism of claim 1, wherein a contour of the arcuate slot in the track member guides a sliding movement of the first hinge shaft, from a position at the first end of the slot corresponding to a folded configuration of the hinge mechanism, and a position at the second end of the slot corresponding to an unfolded configuration of the hinge mechanism.

6. The hinge mechanism of claim 1, wherein any pair of adjacent hinge beams is coupled by at least one hinge track module.

7. The hinge mechanism of claim 2, further comprising:
a protrusion extending outward from a second end portion of the first body portion of the first hinge shaft member; and
an opening formed in a second end portion of the second body portion of the second hinge shaft member, wherein the protrusion is received in the opening.

8. The hinge mechanism of claim 1, wherein the hinge mechanism is configured to be coupled in a computing device including a foldable display, at a portion of the computing device corresponding to a bendable section of the foldable display, with the at least one hinge track module comprising a plurality of hinge track modules, the hinge mechanism further comprising:
a first hinge beam bracket at a first end of the plurality of hinge beams arranged in the row and configured to be coupled to a first housing of a computing device; and
a second hinge beam bracket at a second end of the plurality of hinge beams arranged in the row and configured to be coupled to a second housing of the computing device.

9. The hinge mechanism of claim 8, wherein
the first hinge beam bracket and a hinge beam at the first end of the plurality of hinge beams arranged in the row are movably coupled by one of the plurality of hinge track modules; and
the second hinge beam bracket and a hinge beam at the second end of the plurality of hinge beams arranged in the row are movably coupled by another of the plurality of hinge track modules.

10. The hinge mechanism of claim 8, wherein the hinge mechanism is configured to rotate the first housing and the second housing between an unfolded configuration of the computing device and a folded configuration of the computing device.

11. The hinge mechanism of claim 1, wherein at least one hinge beam of the plurality of hinge beams includes:
a body extending longitudinally along a length of the at least one hinge beam; and
a first wing extending outward from a first side of the body.

12. The hinge mechanism of claim 11, wherein the at least one hinge beam of the plurality of hinge beams includes a second wing extending outward from a second side of the body, opposite the first side of the body.

13. The hinge mechanism of claim 12, wherein the first and second wings have an arcuate contour corresponding to a contour of the first hinge shaft and a contour of the arcuate slot in the track member.

14. The hinge mechanism of claim 13, wherein, in a folded configuration of the hinge mechanism, the first wing extends across a gap formed between the at least one hinge beam and an adjacent hinge beam positioned at the first side of the at least one hinge beam, and the second wing extends across a gap formed between the at least one hinge beam and an adjacent hinge beam positioned at the second side of the at least one hinge beam.

15. The hinge mechanism of claim 14, wherein, in an unfolded configuration of the hinge mechanism, the first wing is received in a space formed between the body of the at least one hinge beam and the body of the adjacent hinge beam positioned at the first side of the at least one hinge beam, and the second wing is received in a space formed between the body of the at least one hinge beam and the body of the adjacent hinge beam positioned at the second side of the at least one hinge beam.

16. A foldable device, including:
a housing having a first portion and a second portion;
a foldable display coupled to the first and second portions of the housing, the foldable display including a bendable section; and
a hinge mechanism positioned between the first portion and the second portion of the housing, at a position corresponding to the bendable section of the foldable display, the hinge mechanism including:
a plurality of hinge beams each extending longitudinally, arranged in a row; and
a plurality of hinge track modules movably coupling adjacent pairs of hinge beams of the plurality of hinge beams, each of the plurality of hinge track modules including:
a track member coupled to a first hinge beam of the respective pair of hinge beams, the track member including an arcuate slot, the arcuate slot having a first end and a second end;
a first hinge shaft member positioned at a first side of the track member and coupled to a second hinge beam of the respective pair of hinge beams, the first hinge shaft member including a first hinge shaft being slidably received in the arcuate slot from the first side of the track member to movably couple the first hinge shaft member to the track member; and
a second hinge shaft member positioned at a second side of the track member and coupled to the second hinge beam of the respective pair of hinge beams, the second hinge shaft member including a second hinge shaft being slidably received in the arcuate slot from the second side of the track member to movably couple the second hinge shaft member to the track member.

17. The foldable device of claim 16, wherein
the first hinge shaft extends outward from a first end portion of a first body portion of the first hinge shaft; and
the second hinge shaft extends outward from a first end portion of a second body portion of the second hinge shaft member.

18. The foldable device of claim 16, wherein, in a folded configuration of the foldable device, the first hinge shaft abuts the first end of the arcuate slot of the track member and the second hinge shaft abuts the first end of the arcuate slot of the track member so as to restrict further sliding of the first and second hinge shafts in a first direction in the arcuate slot.

19. The foldable device of claim 16, wherein, in an unfolded configuration of the foldable device, the first hinge shaft abuts the second end of the arcuate slot of the track member and the second hinge shaft abuts the second end of the arcuate slot of the track member so as to restrict further sliding of the first and second hinge shafts in a second direction in the arcuate slot.

20. The foldable device of claim 17, further comprising:
an opening formed in a second end portion of the first body portion of the first hinge shaft member; and
a pin extending outward from the second end portion of the second body portion of the second hinge shaft member and received in the opening formed in the second end portion of the first body portion of the first hinge shaft member to couple the first hinge shaft member such that the first hinge shaft member, the second hinge shaft member and the first hinge beam of the respective pair of adjacent hinge beams move together, and the first and second hinge shaft members are slidably coupled to the track member.

* * * * *